US009497308B1

(12) United States Patent
Kirchhoff et al.

(10) Patent No.: US 9,497,308 B1
(45) Date of Patent: Nov. 15, 2016

(54) METHOD AND SYSTEMS FOR MESSAGING SERVICES

(71) Applicant: CALLWAVE COMMUNICATIONS, LLC, Brookline, MA (US)

(72) Inventors: Leland W. Kirchhoff, Santa Barbara, CA (US); David C. McClintock, Santa Barbara, CA (US); David S. Trandal, Santa Barbara, CA (US)

(73) Assignee: Callwave Communications, LLC, Brookline, MA (US)

( * ) Notice: Subject to any disclaimer, the term of this patent is extended or adjusted under 35 U.S.C. 154(b) by 0 days.

(21) Appl. No.: 14/508,103

(22) Filed: Oct. 7, 2014

Related U.S. Application Data

(63) Continuation of application No. 14/046,813, filed on Oct. 4, 2013, now abandoned, which is a continuation of application No. 13/615,113, filed on Sep. 13, 2012, now abandoned, which is a continuation of application (Continued)

(51) Int. Cl.
*H04M 1/725* (2006.01)
*H04W 4/14* (2009.01)

(52) U.S. Cl.
CPC ....... *H04M 1/72547* (2013.01); *H04M 1/7255* (2013.01); *H04M 1/72525* (2013.01); *H04W 4/14* (2013.01)

(58) Field of Classification Search
CPC .......... H04W 4/02; H04W 4/12; H04W 4/16
USPC ........................ 455/456.1, 456.2, 466, 412.1
See application file for complete search history.

(56) References Cited

U.S. PATENT DOCUMENTS

| 3,936,613 A | 2/1976 | Nishigori et al. |
| 3,956,595 A | 5/1976 | Sobanski |
| 4,009,337 A | 2/1977 | Sakai et al. |
| 4,022,983 A | 5/1977 | Braun et al. |
| 4,485,470 A | 11/1984 | Reali |

(Continued)

FOREIGN PATENT DOCUMENTS

| CA | 1329852 | 9/1989 |
| EP | 0 509 945 A2 | 10/1992 |

(Continued)

OTHER PUBLICATIONS

Article: "Widget MySpace Widget"; posted by 4INFO Bob; http://4info.typepad.com/blog/2006/09/widpet_myspace_.html; Sep. 15, 2006; 3 pages.

(Continued)

*Primary Examiner* — Qun Shen
(74) *Attorney, Agent, or Firm* — Knobbe, Martens, Olson & Bear LLP

(57) ABSTRACT

Methods and systems are described for processing visual messages, such as text or multimedia messages, originated from a mobile phone. In an embodiment, a visual message from an originating wireless telephonic device is directed to an original destination address associated with a user. An indication that the visual message has been received at a first telecommunications system, wherein an original destination associated with the original destination address is not available to receive the originating wireless telephonic device visual message. The visual message is wirelessly transmitted to an alternate destination.

20 Claims, 11 Drawing Sheets

Related U.S. Application Data

No. 13/360,554, filed on Jan. 27, 2012, now Pat. No. 8,295,865, which is a continuation of application No. 11/757,737, filed on Jun. 4, 2007, now Pat. No. 8,121,626.

(60) Provisional application No. 60/811,068, filed on Jun. 5, 2006.

(56) References Cited

U.S. PATENT DOCUMENTS

| | | |
|---|---|---|
| 4,736,405 A | 4/1988 | Akiyama |
| 4,809,321 A | 2/1989 | Morganstein et al. |
| 4,893,336 A | 1/1990 | Wuthnow |
| 4,994,926 A | 2/1991 | Gordon et al. |
| 5,040,208 A | 8/1991 | Jolissaint |
| 5,046,087 A | 9/1991 | Sakai |
| 5,291,302 A | 3/1994 | Gordon et al. |
| 5,404,537 A | 4/1995 | Olnowich et al. |
| 5,434,908 A | 7/1995 | Klein |
| 5,459,584 A | 10/1995 | Gordon et al. |
| 5,467,388 A | 11/1995 | Redd, Jr. et al. |
| 5,526,407 A | 6/1996 | Russell et al. |
| 5,526,524 A | 6/1996 | Madduri |
| 5,533,102 A | 7/1996 | Robinson et al. |
| 5,533,106 A | 7/1996 | Blumhardt |
| 5,577,111 A | 11/1996 | Iida et al. |
| 5,583,918 A | 12/1996 | Nakagawa |
| 5,619,557 A | 4/1997 | Van Berkum |
| 5,619,708 A | 4/1997 | Ho |
| 5,640,677 A | 6/1997 | Karlsson |
| 5,651,054 A | 7/1997 | Dunn et al. |
| 5,668,861 A | 9/1997 | Watts |
| 5,668,928 A | 9/1997 | Groner |
| 5,751,795 A | 5/1998 | Hassler et al. |
| 5,774,067 A | 6/1998 | Olnowich et al. |
| 5,805,587 A | 9/1998 | Norris et al. |
| 5,809,128 A | 9/1998 | McMullin |
| 5,812,551 A | 9/1998 | Tsukazoe et al. |
| 5,825,867 A | 10/1998 | Epler et al. |
| 5,832,060 A | 11/1998 | Corlett et al. |
| 5,835,573 A | 11/1998 | Dee et al. |
| 5,894,504 A | 4/1999 | Alfred et al. |
| 5,946,386 A | 8/1999 | Rogers et al. |
| 5,960,064 A | 9/1999 | Foladare et al. |
| 5,960,073 A | 9/1999 | Kikinis et al. |
| 5,963,629 A | 10/1999 | Jung |
| 5,995,594 A | 11/1999 | Shaffer et al. |
| 5,995,603 A | 11/1999 | Anderson |
| 6,014,436 A | 1/2000 | Florence et al. |
| 6,032,051 A | 2/2000 | Hall et al. |
| 6,034,956 A | 3/2000 | Olnowich et al. |
| 6,035,031 A | 3/2000 | Silverman |
| 6,044,059 A | 3/2000 | Olnowich |
| 6,078,581 A | 6/2000 | Shtivelman et al. |
| 6,085,231 A | 7/2000 | Agraharam |
| 6,104,800 A | 8/2000 | Benson |
| 6,144,644 A | 11/2000 | Bajzath et al. |
| 6,160,881 A | 12/2000 | Beyda et al. |
| 6,167,127 A | 12/2000 | Smith et al. |
| 6,169,795 B1 | 1/2001 | Dunn et al. |
| 6,169,796 B1 | 1/2001 | Bauer et al. |
| 6,175,622 B1 | 1/2001 | Chiniwala et al. |
| 6,178,183 B1 | 1/2001 | Buskirk, Jr. |
| 6,181,691 B1 | 1/2001 | Markgraf et al. |
| 6,208,638 B1 | 3/2001 | Rieley et al. |
| 6,212,261 B1 | 4/2001 | Meubus et al. |
| 6,230,009 B1 | 5/2001 | Holmes et al. |
| 6,233,318 B1 | 5/2001 | Picard et al. |
| 6,243,378 B1 | 6/2001 | Olnowich |
| 6,253,249 B1 | 6/2001 | Belzile |
| 6,278,704 B1 | 8/2001 | Creamer et al. |
| 6,282,269 B1 | 8/2001 | Bowater |
| 6,304,565 B1 | 10/2001 | Ramamurthy |
| 6,310,939 B1 | 10/2001 | Varney |
| 6,350,066 B1 | 2/2002 | Bobo, II |
| 6,353,660 B1 | 3/2002 | Burger et al. |
| 6,353,663 B1 | 3/2002 | Stevens et al. |
| 6,363,414 B1 | 3/2002 | Nicholls et al. |
| 6,374,102 B1 | 4/2002 | Brachman et al. |
| 6,405,035 B1 | 6/2002 | Singh |
| 6,411,601 B1 | 6/2002 | Shaffer et al. |
| 6,411,805 B1 | 6/2002 | Becker et al. |
| 6,438,216 B1 | 8/2002 | Aktas |
| 6,438,222 B1 | 8/2002 | Burg |
| 6,477,246 B1 | 11/2002 | Dolan et al. |
| 6,496,569 B2 | 12/2002 | Pelletier et al. |
| 6,496,576 B2 | 12/2002 | Tanaka et al. |
| 6,501,750 B1 | 12/2002 | Shaffer et al. |
| 6,505,163 B1 | 1/2003 | Zhang et al. |
| 6,507,643 B1 | 1/2003 | Groner |
| 6,510,162 B1 | 1/2003 | Fijolek et al. |
| 6,510,417 B1 | 1/2003 | Woods et al. |
| 6,512,930 B2 | 1/2003 | Sandegren |
| 6,519,258 B1 | 2/2003 | Tsukazoe et al. |
| 6,526,127 B1 | 2/2003 | Piotrowski et al. |
| 6,535,585 B1 | 3/2003 | Hanson et al. |
| 6,539,084 B1 | 3/2003 | Long |
| 6,546,087 B2 | 4/2003 | Shaffer et al. |
| 6,549,612 B2 | 4/2003 | Gifford et al. |
| 6,553,222 B1 | 4/2003 | Weiss |
| 6,564,264 B1 | 5/2003 | Creswell et al. |
| 6,564,321 B2 | 5/2003 | Bobo, II |
| 6,567,505 B1 | 5/2003 | Omori et al. |
| 6,574,319 B2 | 6/2003 | Latter et al. |
| 6,606,373 B1 | 8/2003 | Martin |
| 6,621,892 B1 | 9/2003 | Banister et al. |
| 6,643,034 B1 | 11/2003 | Gordon et al. |
| 6,658,100 B1 | 12/2003 | Lund |
| 6,661,785 B1 | 12/2003 | Zhang et al. |
| 6,662,232 B1 | 12/2003 | Nicholls et al. |
| 6,687,340 B1 | 2/2004 | Goldberg |
| 6,690,785 B1 | 2/2004 | Stelter et al. |
| 6,751,299 B1 | 6/2004 | Brown et al. |
| 6,775,370 B2 | 8/2004 | Burg |
| 6,775,651 B1 | 8/2004 | Lewis et al. |
| 6,782,088 B1 | 8/2004 | Gabara |
| 6,785,021 B1 | 8/2004 | Gordon et al. |
| 6,792,094 B1 | 9/2004 | Kirkpatrick |
| 6,804,334 B1 | 10/2004 | Beasley et al. |
| 6,813,603 B1 | 11/2004 | Groner et al. |
| 6,857,074 B2 | 2/2005 | Bobo, II |
| 6,865,260 B1 | 3/2005 | Meadows et al. |
| 6,898,275 B2 | 5/2005 | Dolan et al. |
| 6,950,502 B1 | 9/2005 | Jenkins |
| 6,965,917 B1 | 11/2005 | Aloni et al. |
| 6,968,174 B1 | 11/2005 | Trandal et al. |
| 7,003,087 B2 | 2/2006 | Spencer et al. |
| 7,003,554 B1 | 2/2006 | Turner et al. |
| 7,027,567 B1 | 4/2006 | Scott et al. |
| 7,106,843 B1 | 9/2006 | Gainsboro et al. |
| 7,113,768 B2 | 9/2006 | Hundscheidt et al. |
| 7,120,455 B1 | 10/2006 | Chen et al. |
| 7,130,390 B2 | 10/2006 | Abburi |
| 7,136,462 B2 | 11/2006 | Pelaez et al. |
| 7,363,384 B2 | 4/2008 | Chatani et al. |
| 7,436,820 B2 * | 10/2008 | Beck ............... H04L 29/06027 370/352 |
| 7,447,510 B2 * | 11/2008 | Celik et al. .................... 455/466 |
| 7,499,973 B2 | 3/2009 | Couts et al. |
| 7,548,756 B2 | 6/2009 | Velthuis et al. |
| 7,702,792 B2 | 4/2010 | Shaffer et al. |
| 7,725,541 B2 * | 5/2010 | Daniell ................ H04L 12/581 709/203 |
| 7,725,542 B2 * | 5/2010 | Daniell ................ H04L 51/04 455/466 |
| 7,738,479 B2 | 6/2010 | Ruckart |
| 7,822,188 B1 | 10/2010 | Kirchhoff et al. |
| 7,826,605 B1 | 11/2010 | Vanier et al. |
| 7,903,795 B2 | 3/2011 | Hiatt et al. |
| 8,073,429 B2 | 12/2011 | Karaoguz et al. |
| 8,447,285 B1 | 5/2013 | Bladon et al. |
| 8,774,785 B1 | 7/2014 | Kirchhoff et al. |
| 2001/0004741 A1 | 6/2001 | Sogo |
| 2002/0002704 A1 | 1/2002 | Davis et al. |

(56) References Cited

U.S. PATENT DOCUMENTS

| | | |
|---|---|---|
| 2002/0009184 A1 | 1/2002 | Shnier |
| 2002/0010616 A1 | 1/2002 | Itzhaki |
| 2002/0097710 A1 | 7/2002 | Burg |
| 2003/0021403 A1 | 1/2003 | Jones |
| 2003/0039339 A1 | 2/2003 | Luehrig et al. |
| 2003/0063731 A1 | 4/2003 | Woodring |
| 2003/0066065 A1 | 4/2003 | Larkin |
| 2003/0123629 A1 | 7/2003 | Hussain et al. |
| 2003/0142807 A1 | 7/2003 | Dolan et al. |
| 2003/0156700 A1 | 8/2003 | Brown et al. |
| 2003/0167373 A1 | 9/2003 | Winters et al. |
| 2003/0191823 A1 | 10/2003 | Bansal et al. |
| 2003/0220784 A1 | 11/2003 | Fellenstein et al. |
| 2004/0010786 A1 | 1/2004 | Cool et al. |
| 2004/0028203 A1 | 2/2004 | Wurster et al. |
| 2004/0143628 A1 | 7/2004 | Bradford et al. |
| 2004/0153538 A1 | 8/2004 | Champlin |
| 2004/0185883 A1* | 9/2004 | Rukman .............. 455/466 |
| 2004/0190703 A1 | 9/2004 | Trandal et al. |
| 2004/0190706 A1 | 9/2004 | Fleischer, III et al. |
| 2004/0237078 A1 | 11/2004 | Weiss et al. |
| 2004/0258220 A1 | 12/2004 | Levine et al. |
| 2005/0010573 A1* | 1/2005 | Garg .................. 707/10 |
| 2005/0013419 A1 | 1/2005 | Pelaez et al. |
| 2005/0044280 A1 | 2/2005 | Reisman |
| 2005/0053216 A1 | 3/2005 | Spencer et al. |
| 2005/0078612 A1 | 4/2005 | Lang |
| 2005/0119019 A1* | 6/2005 | Jang .................. 455/466 |
| 2005/0123118 A1 | 6/2005 | Terry et al. |
| 2005/0129206 A1 | 6/2005 | Martin |
| 2005/0136955 A1 | 6/2005 | Mumick et al. |
| 2005/0143106 A1 | 6/2005 | Chan et al. |
| 2005/0154599 A1 | 7/2005 | Kopra et al. |
| 2005/0166246 A1 | 7/2005 | Calmels et al. |
| 2005/0186978 A1 | 8/2005 | Lin |
| 2005/0198389 A1 | 9/2005 | LaSalle et al. |
| 2005/0207556 A1 | 9/2005 | Gonzalez et al. |
| 2005/0210459 A1 | 9/2005 | Henderson et al. |
| 2005/0265322 A1 | 12/2005 | Hester |
| 2005/0286498 A1 | 12/2005 | Rand et al. |
| 2005/0287993 A1 | 12/2005 | Gogic |
| 2006/0013374 A1 | 1/2006 | Fleischer et al. |
| 2006/0063541 A1 | 3/2006 | Ryu |
| 2006/0080656 A1 | 4/2006 | Cain et al. |
| 2006/0130045 A1 | 6/2006 | Wesley et al. |
| 2006/0135219 A1 | 6/2006 | Kim et al. |
| 2006/0223502 A1 | 10/2006 | Doulton |
| 2006/0234680 A1 | 10/2006 | Doulton |
| 2006/0234735 A1* | 10/2006 | Digate et al. .............. 455/466 |
| 2006/0268007 A1 | 11/2006 | Gopalakrishnan |
| 2007/0002077 A1 | 1/2007 | Gopalakrishnan |
| 2007/0054678 A1 | 3/2007 | Doulton |
| 2007/0064682 A1 | 3/2007 | Adams et al. |
| 2007/0067738 A1 | 3/2007 | Flynt et al. |
| 2007/0116194 A1 | 5/2007 | Agapi et al. |
| 2007/0116204 A1 | 5/2007 | Doulton |
| 2007/0117543 A1 | 5/2007 | Doulton |
| 2007/0117544 A1 | 5/2007 | Doulton |
| 2007/0117545 A1 | 5/2007 | Doulton |
| 2007/0117546 A1 | 5/2007 | Doulton |
| 2007/0117547 A1 | 5/2007 | Doulton |
| 2007/0118357 A1 | 5/2007 | Kasravi et al. |
| 2007/0123280 A1 | 5/2007 | McGary et al. |
| 2007/0127638 A1 | 6/2007 | Doulton |
| 2007/0127688 A1 | 6/2007 | Doulton |
| 2007/0143422 A1 | 6/2007 | Cai |
| 2007/0155369 A1 | 7/2007 | Jobs et al. |
| 2007/0178919 A1* | 8/2007 | Huggett .............. H04W 88/184 455/466 |
| 2007/0202898 A1 | 8/2007 | Bae et al. |
| 2007/0233795 A1 | 10/2007 | Setlow et al. |
| 2007/0238443 A1 | 10/2007 | Richardson |
| 2007/0238451 A1 | 10/2007 | Borzsei |
| 2007/0274465 A1 | 11/2007 | Othmer |
| 2007/0280434 A1 | 12/2007 | Howell et al. |
| 2008/0084982 A1 | 4/2008 | Chatterjee |
| 2008/0140398 A1 | 6/2008 | Shpigel |
| 2008/0280644 A1 | 11/2008 | Hugot |
| 2008/0298574 A1 | 12/2008 | Koch |
| 2009/0239504 A1 | 9/2009 | Turk |
| 2011/0113343 A1 | 5/2011 | Trauth |
| 2011/0196926 A1 | 8/2011 | Crawford |

FOREIGN PATENT DOCUMENTS

| | | |
|---|---|---|
| EP | 1 120 954 | 8/2001 |
| EP | 1 213 647 A1 | 6/2002 |
| EP | 1 282 036 A2 | 2/2003 |
| JP | 10-513632 | 12/1998 |
| JP | 11-506292 | 6/1999 |
| JP | 2001-168989 | 6/2001 |
| WO | WO 96/18948 | 6/1996 |
| WO | WO 97/26749 | 7/1997 |
| WO | WO 00 60840 | 10/2000 |
| WO | WO 01/76210 | 10/2001 |
| WO | WO 03/063533 A2 | 7/2003 |

OTHER PUBLICATIONS

Article: Communications-SMS, Dashboard Widgets—Showcase; http://www.dashboardwidgets.com/showcase/details.php?wid=1082; Oct. 14, 2005; 2 pages.

Johnson, Dave; Article; "Now You're Talking—voice—response systems for home offices—Product Information"; http://www.findarticles.com; Feb. 1999.

Microsoft® Windows® Server Technical Article; "*Background Intelligent Transfer Service*," Microsoft Corporation, Published Aug. 2002, pp. 1-18.

\* cited by examiner

Send A Text Message

To: [Do|  ▼]    Address: [　　　▼]

Subject: [John Doe　　　]
　　　　　[Jane Doe　　　][4/24/06 11:14 am]

Message: [　　　　　　　　　　　]

☑ Attach voice message

[Send]

*FIG. 5*

METHOD AND SYSTEMS FOR MESSAGING SERVICES

CROSS-REFERENCE TO RELATED APPLICATIONS

This is a continuation of U.S. patent application Ser. No. 14/046,813, filed Oct. 4, 2013, which is a continuation of U.S. patent application Ser. No. 13/615,113, filed Sep. 13, 2012, now abandoned, which is a continuation of U.S. patent application Ser. No. 13/360,554, filed Jan. 27, 2012, now U.S. Pat. No. 8,295,865, which is a continuation of U.S. patent application Ser. No. 11/757,737, filed Jun. 4, 2007, now U.S. Pat. No. 8,121,626, which claims priority from U.S. Patent Application No. 60/811,068, filed Jun. 5, 2006, the contents of which are incorporated herein by reference in their entirety.

STATEMENT REGARDING FEDERALLY SPONSORED R&D

Not applicable.

PARTIES OF JOINT RESEARCH AGREEMENT

Not applicable.

REFERENCE TO SEQUENCE LISTING, TABLE, OR COMPUTER PROGRAM LISTING

Not applicable.

BACKGROUND OF THE INVENTION

1. Field of the Invention

The present invention relates generally to telecommunications and messaging and in particular, to systems and methods for handling messages over a wireless network.

2. Description of the Related Art

In conventional wireless networks, users generally have the ability to send and receive text messages between other wireless users or other hand held devices. This service is referred to as a Short Messaging Service.

For example, conventionally messages are sent from a mobile user via a store-and-forward mechanism to a Short Message Service Center (SMSC), which will attempt to send the message to the recipient and possibly retry sending the message if the user mobile device is not reachable at a given moment. However, conventionally, message delivery is on a best efforts basis. Thus, message delivery to a designated recipient is not guaranteed, and delay or complete loss of a message is not uncommon, particularly when sending SMS messages between network operators.

SUMMARY OF THE INVENTION

Example methods and systems are described that can be utilized to wirelessly forward a message (e.g., an SMS or MMS message) to a destination, such as a destination other than the originally addressed destination. For example, a forward operation may be triggered when a certain condition is detected, such as when the original destination (e.g., a mobile phone), is not available to receive the message. Certain embodiments further forward or broadcast a message (e.g., an SMS or MMS message) to a plurality of destinations, even if the message is addressed to a single destination. Certain embodiments store a message intended for an unavailable destination, such as a mobile phone, and when the destination becomes available, transmits the stored message to the destination.

An example embodiment provides a method of communicating a Short Messaging Service message from an originating device directed to an original destination address associated with a user, the method comprising: receiving at an SMS relay an indication that an SMS message has been received, the indication including the original destination address, wherein an original destination associated with the original destination address is not available to receive the SMS message; storing the SMS message on a networked server; and transmitting to a telecommunications client and/or an email address associated with the user an indication that an SMS message has been received.

An example embodiment provides a method of communicating a mobile phone message from an originating wireless mobile telephonic device directed to an original destination address associated with a user, wherein the mobile telephonic device message is a text message or multimedia message, the method comprising: receiving at a first telecommunications system an indication that a mobile telephonic device message has been received, the message including the original destination address, wherein an original destination associated with the original destination address is not available to receive the mobile telephonic device message; and transmitting to a telecommunications client and/or an email address associated with the user an indication that a mobile telephonic device message has been received.

An example embodiment provides a method of communicating a visual message from an originating device directed to an original destination phone address associated with a user, the method comprising: receiving at a first telecommunications system an indication that the visual message has been received, wherein an original destination associated with the original destination phone address is not available to receive the originating visual message; and transmitting the visual message to an alternate destination specified by the user.

BRIEF DESCRIPTION OF THE DRAWINGS

Embodiments of the present invention will now be described with reference to the drawings summarized below. These drawings and the associated description are provided to illustrate example embodiments of the invention, and not to limit the scope of the invention.

FIG. 5 illustrates an example user interface of a text message creation window.

DETAILED DESCRIPTION OF PREFERRED EMBODIMENTS

Figure 1:
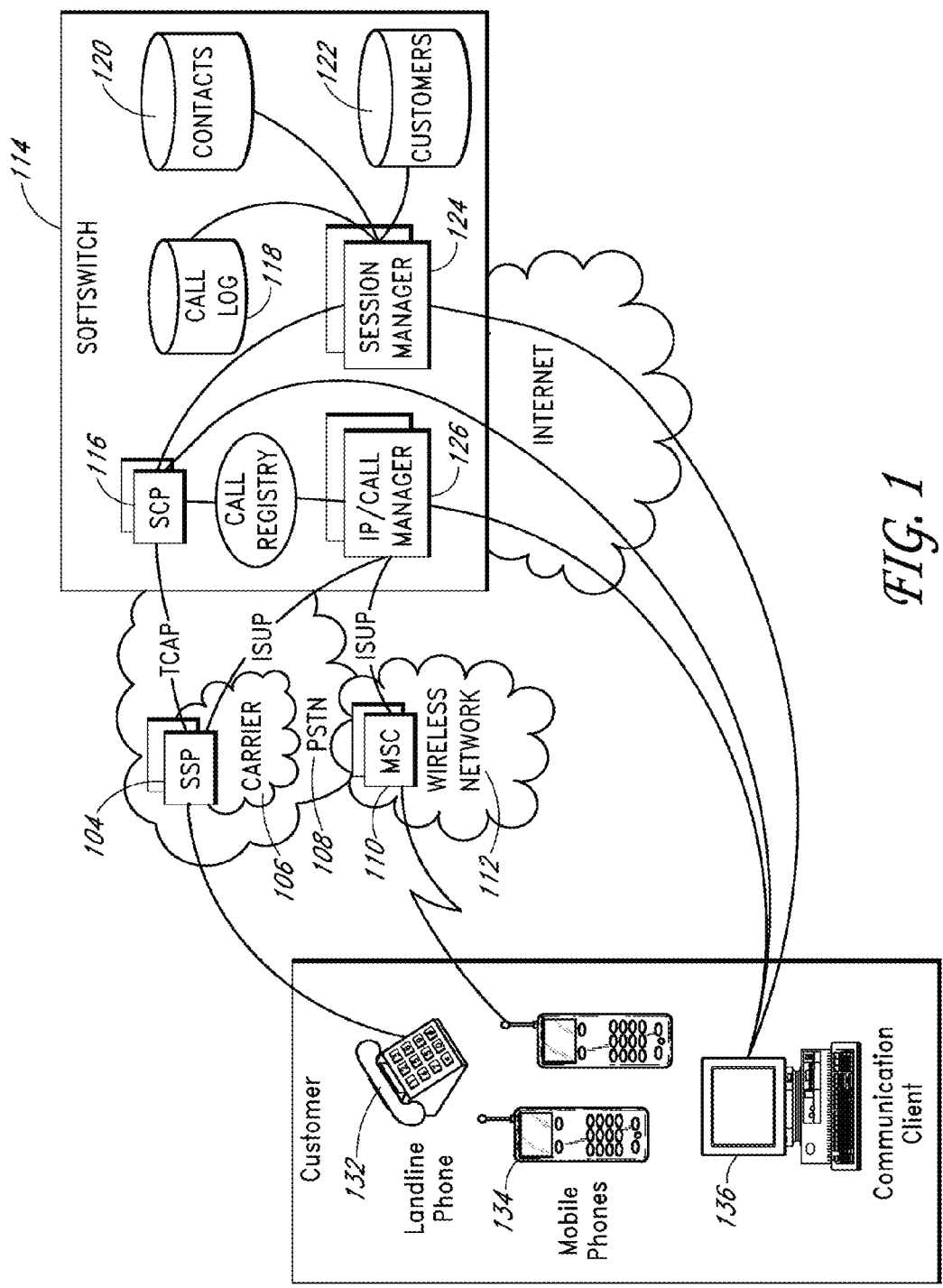
FIG. 1 illustrates an example network operating environment for advanced telecommunications services.

Embodiments herein relate to telecommunications and messaging, and, for example, to methods and systems for providing messaging services, such as Short Message forwarding services or Multimedia Message forwarding services.

By way of example, methods and systems are described that wirelessly forward a message (e.g., an SMS or MMS message) to a destination other than the addressed destination and/or that forward or broadcast a message (e.g., an SMS or MMS message) to a plurality of destinations, even if the message is addressed to a single destination.

In an example embodiment, a Short Message Forwarding service (or other visual message forwarding service that handles messages intended to be viewed or read) provides additional value to wireless network customers or to other customers that communicate using SMS (or other visual message service) by enabling them to receive a forwarded Short Message (or other visual message) at another destination or device when the originally messaged destination (e.g., a mobile cellular phone, personal digital assistant, other SMS-capable mobile device, or other SMS device) is not accessible, e.g., is off or is out of range. Optionally, using message forwarding, the Short Message may still be delivered to the originally messaged destination when it is again accessible. Because the message is forwarded, the message may reach the destination device and the designated recipient in a more timely fashion.

Certain example methods and systems described herein enable a user to receive a message (e.g., a Short Message Service text message, a Multimedia Message Service multimedia message, etc.) at a location other the original designated destination (e.g., at a location other than a user's mobile device to which a Short Message Service text message is addressed), optionally while also receiving the message at the original designated location. In contrast to many conventional user interfaces, certain embodiments of the Short Message-related processes and apparatus disclosed herein take advantage of a telecommunications client hosted on a user terminal and connected to the telephone network (e.g., the public switched telephone network (PSTN), a wireless network, etc.) over the Internet.

In an example embodiment, the customer may configure one or more SMS/MMS and email forwarding addresses. Optionally, a message is sent to each address when a Short Message or Multimedia Message is received by an SMSC or a softswitch, as described below.

For example, optionally, a Short Message (SM) and/or email will automatically be forwarded to a telecommunications client as a default, but the subscriber can specify (e.g., via an account set-up/members zone Web page, via a Web site of a corresponding carrier partner, or via a telecommunications client, wherein the specification is stored in computer readable memory such as a database) that the SM be forwarded to other destinations instead of or in addition to the client. Optionally, an SM will not be forwarded to the telecommunications client unless the subscriber so specifies in the subscriber's account setup.

In an example embodiment, an underlying wireless carrier providing the Short Message Service and/or a Multimedia Message Service is equipped with a database, such as a Home Location Register (HLR), that contains information (e.g., a mobile device identifier, a mobile device telephone number, call/message forwarding information, location updates, and/or an indication as to whether the mobile device is roaming, with a mobile device is registered, etc.) regarding wireless subscribers and their mobile device(s), and a system for storing a message and transmitting that message to its destination, such as a Short Message Service Center (SMSC) and/or a Multimedia Service Center (MMSC), configured and enhanced to support Short Message Forwarding and Multimedia Message Forwarding as described herein.

Throughout the following description, the term "Web site" or "Web" is used to refer to a user-accessible network site that implements the basic World Wide Web standards for the coding and transmission of hypertextual documents. These standards currently include HTML (the Hypertext Markup Language) and HTTP (the Hypertext Transfer Protocol). It should be understood that the term "site" is not intended to imply a single geographic location, as a Web or other network site can, for example, include multiple geographically distributed computer systems that are appropriately linked together. Furthermore, while the following description relates to an embodiment utilizing the Internet and related protocols, other networks, such as networked interactive televisions, and other protocols may be used as well.

In addition, throughout the following description, the terms message, messaging, and Short Message are used to refer to text messages as well as to mixed media messages including but not limited to text or other visual messages (e.g., including Instant Messages), MMS, voice, fax, HTML, photos, video, music, program code, etc. Message content can be embedded in the body of the message, included as an attachment (e.g., a text file or voice attachment), or referenced or linked (e.g., by use of an embedded URL).

Further, while the following description refers to example network, messaging (e.g., SMS), and telephony standards and protocols (e.g., SS7, wireless protocols, etc.), other standards and protocols can be used as well. In addition, while references may be made to electronic address books or contact lists, other data stores and formats can be used to store contact information. In addition, unless otherwise indicated, the functions described herein may be performed by executable program code and instructions stored in computer readable memory and running on one or more processor-based systems. However, state machines, and/or hardwired electronic circuits can also be utilized. Further, with respect to the example processes described herein, not all the process states need to be reached, nor do the states have to be performed in the illustrated order. Further, certain process states that are illustrated as being serially performed can be performed in parallel.

Similarly, while certain examples may refer to a personal computer system or data device, other computer or electronic systems can be used as well, such as, without limitation, an interactive television, a networked-enabled personal digital assistant (PDA), a networked game console, a networked entertainment device, and so on. While certain references are made to certain example system components or services, other components and services can be used as well. In addition, while certain user inputs are described as being provided via phone key presses or by clicking on a button, optionally, user inputs can be provides using other techniques, such as by voice or otherwise. While certain phone numbers are referenced for purposes of illustration, other phone numbers or electronic addresses or locators can be used as well.

The term phone address can include a SIP address, a Skype address (or other peer-to-peer Internet telephony network address), a wireless phone number, an International number, an E.164 phone number, or other address. While Skype is referred to herein, other peer-to-peer telephony networks (e.g., having a decentralized and distributed user directory distributed among the nodes in the peer-to-peer telephony network) may be used as well to receive calls, place calls, and/or transfer calls. While certain phone addresses are referenced for purposes of illustration, other electronic addresses or locators can be used as well. While a SIP federated phone may be referred to, other data phones, such as an XMPP federation phone, a Skype phone (or other phone that communicates via a peer-to-peer telephony network), or other networked phone, which may be in the form of a softphone, may be used.

Figure 3:
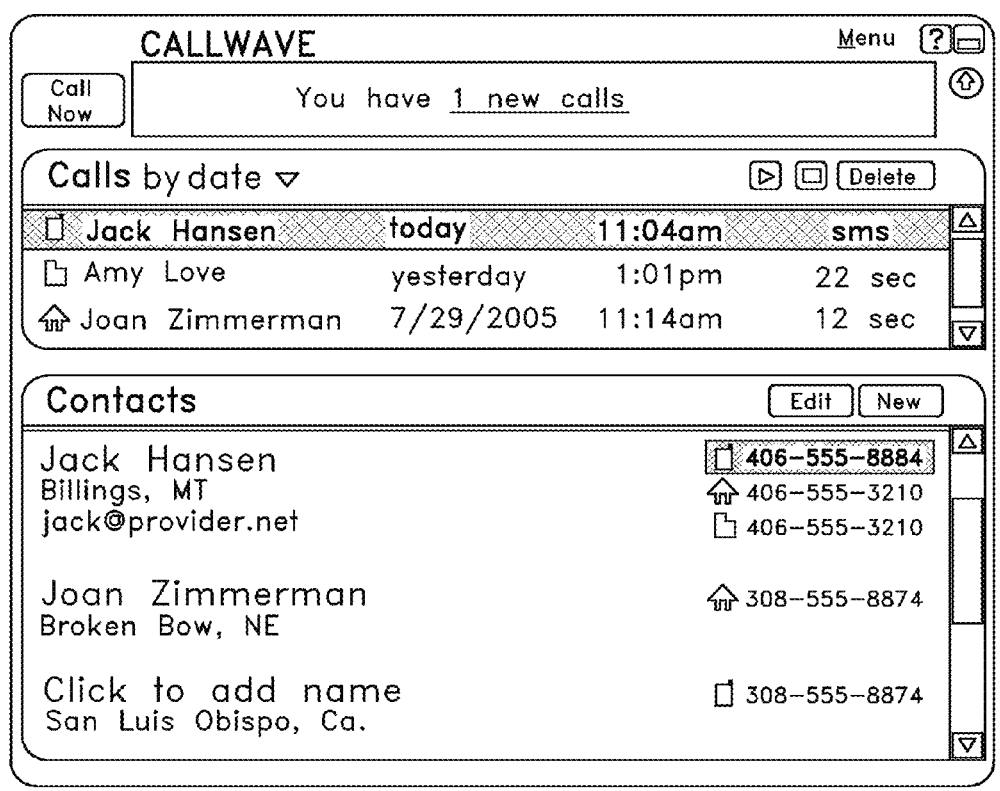
FIG. 3 illustrates a first example telecommunications client call log and user contacts user interface with text reply and forward.

The term mobile device can include a telephone, such as a cellular mobile device compatible with CDMA, GSM, HSDPA, UMB, WiMax, and/or other standards In addition, certain call management capabilities described herein make use of a telecommunications client (e.g., a personal computer client, a client hosted on an interactive television, a network personal digital assistant, a smart phone, or a wireless phone with an Internet connection, etc.) to give the customer access to and management of calls (e.g., see example user interface illustrated in FIG. 3). Optionally, a customer can have multiple clients hosted on multiple computers or other hosts.

In an example embodiment, the telecommunications client application connects to and communicates with a system (e.g., a softswitch) via the Internet, an intranet, and/or other network. The client application, executing on a subscriber's computer terminal or other host, can make the subscriber's online presence known to the softswitch (e.g., by transmitting a message over the Internet to the softswitch). The client can be used to receive, edit, and display call log data from the softswitch (e.g., a list of calls placed to/received by the subscriber, or placed by the subscriber, including phone numbers, caller or called party names, date/time of the call, an indication as to whether a call was an outbound/inbound call, the city/state of the caller/called party, type of call voice, text, or fax, etc.), and call alert data (e.g., for an active call, listing the caller phone number, name, city/state, and/or call status (e.g., ringing, playing greeting, recording caller message, terminating call, displaying fax)). Optionally, the call alert also plays an audible signal, such as a ring tone.

The client application can display a log of recorded or received messages from callers, and can provide playback controls (e.g., play, fast forward, rewind) for playing back or displaying the recorded message (e.g., a voice message, a video message, a fax message, a text message, etc.) via the client computer terminal. The client optionally can also be used to screen calls (e.g., wherein the softswitch streams a message being left by a caller and stored in memory to the client so that the called party can listen to the message in substantially real time) and to instruct the softswitch to accept calls on the host computer terminal, forward calls, refuse calls, initiate call conferencing, and to otherwise provide call handling instructions. Optionally, the client application can be automatically and/or manually (e.g., directly in response to a user instruction) upgraded to a newer or different version over a data network, such as the Internet. For example, a system, such as an upgrade manager system (e.g., as part of the call processing system or independent of the call processing system), can provide client application downloads to users based on the current version being used by the users (e.g., are they using versions older than an available upgrade) and/or a level of authorization associated with users (e.g., is the user entitled to an upgrade). The upgrade manager system can download the application to the application host terminal in burst mode and/or in a trickle, background mode.

Figure 4:
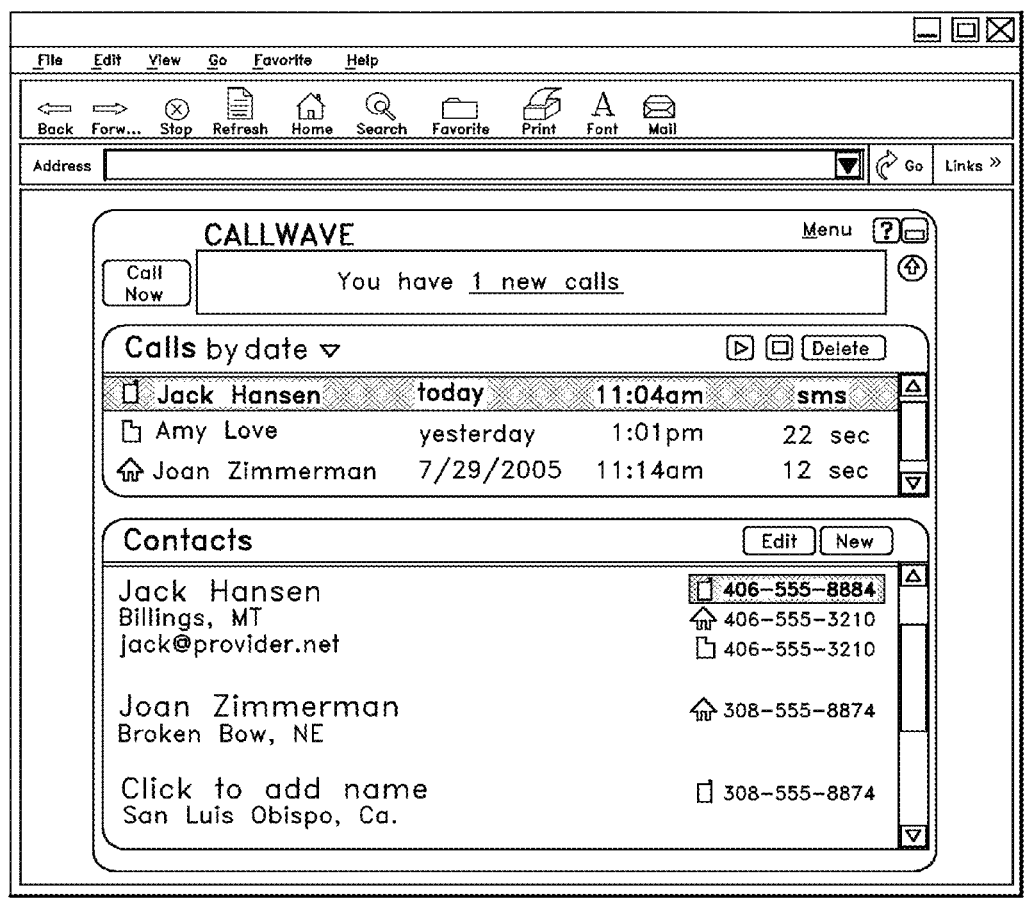
FIG. 4 illustrates an example user interface of a call log via a web browser.

The telecommunications client is an example user interface and other user interfaces can be used in addition or instead. FIG. 4 illustrates another example call log user interface presented via a browser to a customer. The browser can be executing on a computer terminal, such as a personal computer, a smart phone, a browser/Wireless Application Protocol (WAP)-enabled phone, a PDA, or the like. The call log can be accessed by supplying the appropriate URL to the browser and optionally providing log-on information, such as a user name and a password.

Enhanced service providers, such as CallWave, have emerged, providing new features and functions on ordinary phone calls. By way of example, CallWave provides call screening and transfer features that enhance the customer's calling experience, such as those described in U.S. Pat. No. 7,103,167, the contents of which are incorporated herein in their entirety by reference. Other embodiments of Short Message service applications are described in U.S. Pat. No. 6,879,677 issued Apr. 12, 2005, the contents of which are incorporated herein in their entirety by reference.

Other embodiments of related call management functions—call logging, caller name, call screening, fixed-mobile converged routing, privacy management, and bridged outcall—some or all of which can be applied in offering this service, are described in the following patent applications, the contents of which are incorporated by reference in their entirety:

U.S. patent application Ser. No. 11/366,989, filed Mar. 2, 2006, entitled "Methods and Systems for Creating a Dynamic Call Log and Contact Records";

U.S. Provisional patent application, 60/781,894, filed Mar. 13, 2006, entitled "Methods and Systems for Personalizing Calling/Caller Name";

U.S. patent application Ser. No. 11/374,390, filed Mar. 13, 2006, entitled "Systems and Methods for Call Screening";

U.S. patent application Ser. No. 11/040,185, entitled "Methods and Systems for Transferring Data Over a Network", U.S. Provisional patent application Ser. No. 11/676,933, filed Feb. 20, 2007, entitled "Methods and Systems for Telephony Call Processing".

The functionality, operation, and implementation for an example Short Message Forwarding service will now be described in detail.

GLOSSARY

AIN—Advanced Intelligent Network
CP—Carrier Partner
IP—Intelligent Peripheral
MSC—Mobile Switching Center
MVNO—Mobile Virtual Network Operator
SCP—Service Control Point
SM—Short Message
SMS—Short Message Service
SMSC—Short Message Service Center
SMPP—Short Message Peer to Peer Protocol
SS7—Signaling System 7

SSP—Service Switching Point
TCAP—Transaction Capabilities Application Part

FIG. 1 illustrates an example advanced telecommunications network environment.

A carrier (e.g., a Carrier Partner who is a partner or has an arrangement with a third party call processing operator in providing enhanced call processing services) customer has one or more landline phones that connect to an SSP 104 (Service Switching Point) in the carrier's network 106. The user/customer may also have one or more mobile phones 134 and one or more hosts (e.g., personal computers, smart phones, interactive televisions, networked game consoles, etc.) executing a telecommunications client 136. The telecommunications client 136 has one or more user interfaces that optionally display some or all of the following: a call log (including a log of SMS or other visual message), a contact record/list, and active, in-progress calls, and speed dial assignments.

Optionally, the customer can elect to screen or take an active call via the client 136 (e.g., where the customer hears the caller recording a message by the softswitch via a half-duplex streaming of the message to the client 136, but where the caller cannot hear the customer). Optionally, calls can also be made via the telecommunications client 136 (e.g., where the host is equipped with a speaker and microphone). Optionally, the telecommunications client 136 also displays text messages, such as SMS or instant messages.

Some or all of the foregoing client capabilities can optionally be provided via one or more web pages, widgets, gadgets, or other user interfaces. Further, optionally a subscriber can configure certain aspects of their account, such as forwarding rules (e.g., SMS, MMS, and/or other message forwarding rules), speed dial assignments, ringback signal assignments, busy signal assignments, call routing priorities and/or other instructions, via the telecommunications client 136, an account configuration/set-up web page (e.g., hosted by the softswitch 114), a widget, a gadget, or otherwise.

In this example, the softswitch 114 has one or more components, some of which are optionally centralized at a given location, others of which may be co-located in the carrier's network (e.g., to reduce network transport costs). The SCP 116 (Service Control Point) is an AIN component that interacts with one or more SSPs 104 (e.g., using the TCAP protocol). AIN triggers are optionally armed for the customer's landline phone number/address/account so that when calls are made to or from the landline phone 132 (e.g., a POTS landline phone that communicates via a switched circuit network such as the PSTN 108), a trigger fires and causes the SSP 104 to query the SCP 116 for instructions on how to handle the call. The SCP 116 is optionally also configured to perform TCAP queries to other SS7 components as needed by some services (e.g., request Automatic Callback from another carrier's switch when a line becomes idle) or to provision certain features.

Optionally, SS7 Wireless Intelligent Network (WIN) triggers and features are set in the mobile switches of Wireless Carrier Partners to provide similar calling services but for a customer's mobile phone number/address/account.

The softswitch 114 also optionally contains one or more systems 126, referred to herein as call managers. The call managers 126 are connected to the PSTN 108 (e.g., via ISDN using the ISUP (ISDN User Part) protocol, by way of example). The call managers 126 service or provide some or all of the following: provide a call screening service when screening is to be provided, record a message from a caller that is to be recorded, provide a voice prompt or message that is to be played to a caller and/or called party, record a facsimile document that needs to be recorded in a database, detect speech or DTMF tones, convert speech that needs to be converted to text, and/or provide an inbound/outbound gateway between the SS7 network and SIP networks. The example call manager 126 optionally can also act as an IP (Intelligent Peripheral), another AIN component that the SCP 116 can instruct the SSP 104 to connect into the call for interaction with the called and calling party. The IP/call managers 126 and SCPs 116 in the softswitch 114 optionally share a Call Registry that stores information about active calls.

The session managers 126 in the softswitch 114 track telecommunication client 136 presence and interact with a given telecommunications client 136 (e.g., a personal computer client) as call log, contact, and/or customer data need to be synchronized with centralized databases to provide the customer, via the client 136, with updated log, contact, and/or customer data. The session managers 126 also optionally provide the SCP 116 with service configuration information for the customer involved in a call. During an active call, the SCP 116 and/or IP/call manager 126 optionally directly interact with the telecommunications client 136 to provide call progress information, and to stream audio to the client 126.

The softswitch 114 in this example contains centralized databases and/or general-purpose storage areas, optionally including, but not limited to, some or all of the following: a call log database 118, a contacts database 120, and a customer database 122. The call log database 118 stores call events and related data for incoming and outgoing calls. The contacts database 120 stores information and parameters (e.g., names, identifiers, and/or phone numbers/addresses, etc.) associated with a called or calling party. The customer database 122 stores information and parameters (e.g., account data and configuration information) associated with subscribers/customers.

The softswitch call processing system 114 optionally includes one or more other subsystems, such as some or all of the following: a router subsystem, which serves as an interface to the Internet to manage communications between online IP client devices and one or more call processing servers, a web server subsystem to manage a "website" associated with the softswitch 114 (e.g., via which a user can access an account set-up/configuration user interface, a speed dial assignment user interface, a call log 118, a contacts database 120, etc., using a browser or other network user interface), etc. These foregoing subsystems are optionally interconnected via a Local Area Network (LAN), a Wide Area Private Network (WAN), and/or a Wide Area Public Network (e.g., Internet).

The call manager 126 can communicate with the mobile phones 134 across the PSTN 108 over a wireless network 112 via the corresponding MSC 110. The softswitch 114 (e.g., via the call manager 126 and session manager 124) can communicate over the Internet 128 with the telecommunications client 136, browsers, widgets, etc.

Figure 2:
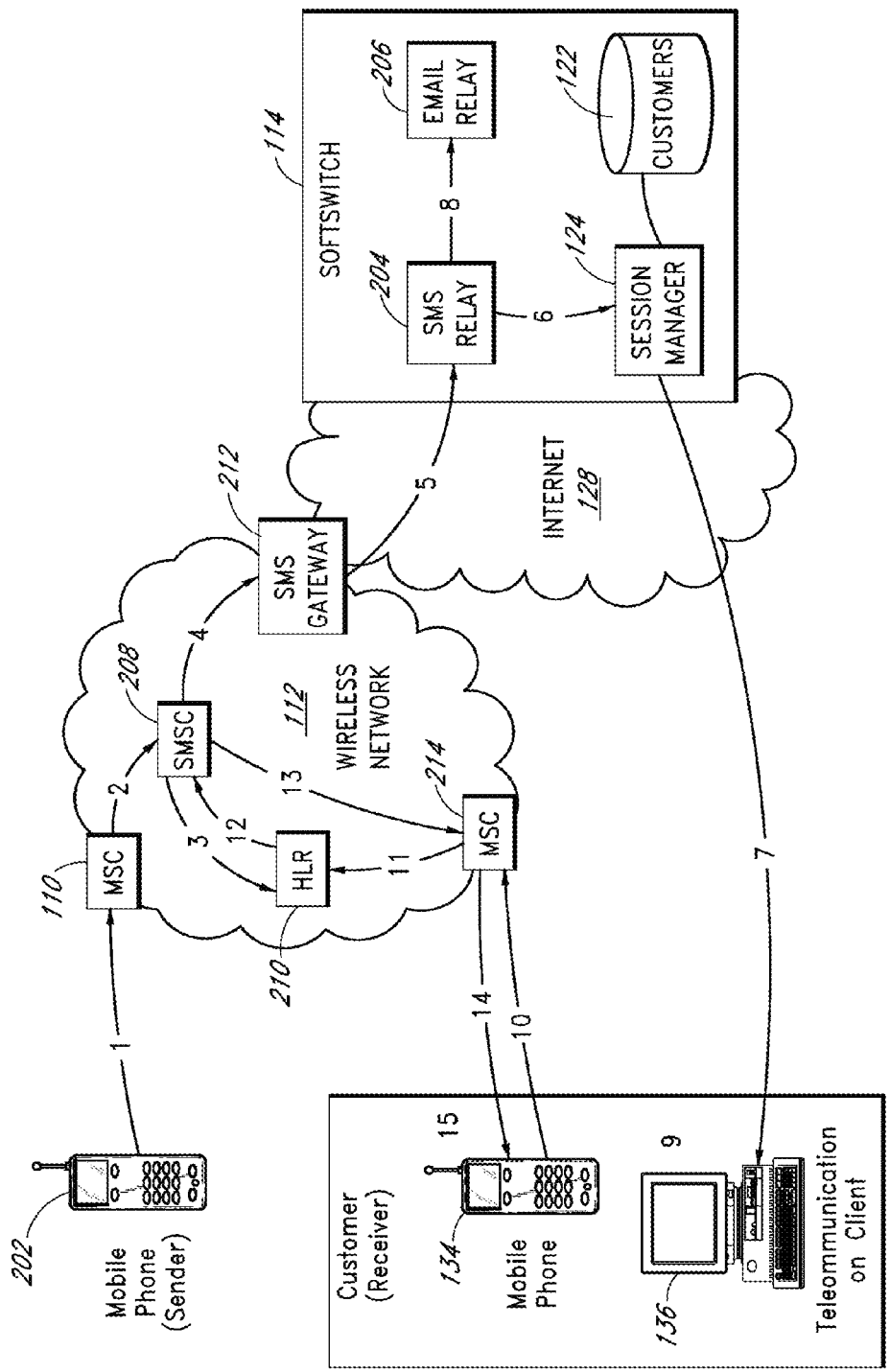
FIG. 2 illustrates a first example operating environment and example messaging service.

As illustrated in FIG. 2, the softswitch 114 call processing system optionally includes one or more other subsystems, such as some or all of the following: an SMS relay 204 subsystem, which receives inbound Short Message Service messages (also referred to herein as Short Messages) via an SMPP protocol for example; an email relay subsystem 208 which formats and sends email messages via SMTP, by way of example; a router subsystem, which serves as an interface to the Internet to manage communications between online IP client devices and one or more call processing servers, a web server subsystem to manage a website associated with the softswitch 114 (e.g., via which a user can access an account set-up/configuration user interface, a call log, a contacts database, etc., using a browser or other network user interface), etc. These foregoing subsystems are optionally interconnected via a Local Area Network (LAN), a Wide Area Private Network (WAN), and/or a Wide Area Public Network (e.g., Internet).

FIG. 2 depicts an example scenario in which a person uses their mobile phone to send a message, such as a Short Message (SM), to a designated recipient's mobile phone (although a different type of SMS-enable device can be a destination). However, designated recipient's mobile phone is unavailable (e.g., the designated recipient turned off the destination mobile phone upon coming home), and thus cannot receive the message. The SM is then forwarded to the designated recipient's telecommunications client (e.g., hosted on the designated recipient's personal computer or other host) per forwarding rules configured by the service provider or user (e.g., via an account set-up/members zone Web page, via a Web site of a corresponding carrier partner, or via a telecommunications client, wherein the rules or configuration is stored in a database, such as a customer account database) in the wireless network. In this example, the user specified that a notification regarding SMS messages (optionally including the message, sender name, and time of transmission and/or receipt) is to be transmitted to a specified email address. The example SM handling sequence scenario of FIG. 2 is now described in more detail:

State 1. The Sender, using mobile phone 202 (or other device capable of sending a Short Message), composes an SM and addresses it to the Designated recipient's mobile phone 134 (or other device capable of receiving Short Messages). The mobile phone 202 wirelessly transmits the SM. A Mobile Switching Center (MSC 214, which may be the same as MSC 110 illustrated in FIG. 1) (or other telephone exchange which provides circuit-switched calling, mobility management, communication services to mobile phones roaming within the area served by the exchange, such as voice, data, SMS, and/or call forwarding services), currently serving the Sender receives the SM.

State 2. The MSC 214 sends the SM to the home Short Message Service Center (SMSC 208).

State 3. The SMSC 208 queries the Home Location Register (HLR 210) for the location of the phone to which the SM is addressed. The HLR 210, in this example, indicates that the Designated recipient's mobile phone is not currently registered in the wireless provider's network and returns to the SMSC 208 the configured SM forwarding address.

State 4. In this example, the forwarding address is not one served by the SMSC 208, so the SMSC 208 makes a copy of the message, addresses it to the HLR 210 specified forwarding address, and sends it to the Inter-Carrier SMS gateway 212 used by that wireless carrier. The SMSC 208 also queues the SM for later wireless delivery to the Designated recipient's mobile phone 134.

State 5. The Inter-Carrier SMS gateway 212 recognizes the address in the received SM as being serviced by another carrier. The Inter-Carrier SMS gateway 212 creates a connection to the SMS relay 204 in the softswitch 114 of the carrier serving the Designated recipient and using a message transport protocol (e.g., Short Message Peer to Peer (SMPP) protocol) transfers the SM the SMS relay 204.

State 6. The SMS relay 204 within the softswitch 114 sends a notification message to the session manager 124 indicating that an SM has been received. The notification message includes the original destination address or other identifier associated therewith.

State 7. The session manager 124 verifies the address or other identifier is that of a customer (e.g., a subscriber of a service offered by the operator of the softswitch 114 and/or other entity having an account associated with the softswitch 114), optionally by determining if the address or other identifier matches or corresponds to a customer address or other identifier in the customer database 122 (which stores customer account records). The session manager 124 optionally notifies one or more telecommunication clients that are currently online (e.g., such as client 136) via a wired and/or wireless network associated with the customer of the new message. In this example, since the designated recipient also configured the service (e.g., via a web interface) to be notified of messages at a specified email address, the session manager 124 returns this email address to the SMS relay 204.

State 8. The SMS relay 204 transmits the SM message to the email relay 206 to send the SM to the Designated recipient's specified email address via a wired or wireless network. The SM text, other media and other attachment or link, if any, are included in the message.

State 9. In response to the session manger notification, the telecommunications client 136 alerts the designated recipient that a new message has been received via visual and/or audible notifications via the telecommunications client or browser user interface. The Designated recipient clicks on the message notification entry to have the client application 136 or browser user interface display the message (optionally the client can be configured to automatically display the message), reviews the message, and composes and sends a reply (e.g., using the example interface illustrated in FIG. 5). The reply follows the reverse path through the session manager 124, SMS Server, SMS gateway 212, SMSC 208, and MSC 214 back to the mobile phone 202 (or other sending device) of the original Sender. The Designated recipient's mobile phone address is optionally automatically used as the "from" address for the reply.

State 10. When the Designated recipient's mobile phone 134 is next turned on (e.g., the next morning), the mobile phone registers with the nearest MSC (e.g., MSC 214) if one is available.

State 11. The MSC 214 informs the HLR 210 of the registration (e.g., via a message transmitted from the MSC 214 to the HLR 210).

State 12. The HLR 210 informs the SMSC 208 via a message transmitted from the HLR 210 to the SMSC 208 of the registration since it knows there is an SM queued.

State 13. The SMSC 208 transmits the queued SM to the MSC 214.

State 14. The MSC 214 transmits a notification to the mobile phone 134 informing the mobile phone there is a message waiting. In response, the mobile phone display displays an icon and/or text indicating that there is an SM waiting.

State 15. The Designated recipient notices the message waiting icon and/or text via the mobile phone 134 and requests to view the SM (e.g., via a menu selection, by clicking on an entry corresponding to the SM, or otherwise). The Designated recipient deletes the message as it is an old message that was previously reviewed (e.g., via the telecommunications client or browser at state 9).

At state 4 above, optionally rather than sending the message to an Inter-Carrier Gateway, the SMSC 208 is configured to send a copy of the message directly to: a) a subscriber's forwarding address, b) to a message relay (e.g., in the softswitch 114), and/or c) one or more computer telecommunications clients over an IP connection. Other forwarding service implementations can be used as well.

At state 4 above, the HLR query by the SMSC 208 can be configured to generally or always return a forwarding address. Optionally, any Short Message directed to a designated recipient (or Short Message meeting certain criteria, such as being on a forwarding list or not being on a do not forward list) is mirrored to one or more telecommunication clients associated with the designated recipient and one or more email addresses, instant messaging addresses, or other addresses. Optionally, a message sync function is provided whereby deleting a message on one message store (e.g., a telecommunication client host), triggers or causes the deletion of queued messages at the SMSC 208.

The HLR 210 stores a forwarding address or equivalent identifier, similar to how the HLR 210 stores a call divert setting or forwarding phone number for missed calls. This forwarding address is optionally configured via the Web interface (e.g., via an account set-up/members zone Web page, via a Web site of a corresponding carrier partner, or via a telecommunications client), which in turn interfaces to the HLR 210 to perform the configuration edit. In addition or instead, the forwarding address is optionally configured by the user sending an SM to a specific designated phone number or destination. Other methods of configuring a forwarding address within the HLR 210 include but are not limited to having the service provider's call center or an Interactive Voice Response system.

The SMSC 208 is optionally also configured to receive and apply a forwarding address from the HLR 210 when the recipient of an SM is not registered for service with the HLR 210.

Optionally, in addition or instead, the SMS relay 204 is configured to notify the SMSC 208 if the SMS relay 204 has positive acknowledgement that the customer viewed the SM at the telecommunications client 136, and could therefore remove the message from the SMSC queue.

When a user (e.g., a customer that subscribes to or otherwise has the Short Message Forwarding service) modifies a forwarding address (e.g., via an account set-up/members zone Web page, via a Web site of a corresponding carrier partner, via a telecommunications client, or otherwise), the softswitch interfaces with the carrier partner's HLR (or entity storing the forwarding address parameter) to make the change. The interface with the Carrier Partner's HLR can be performed substantially immediately after the user specifies or modifies the forwarding address, at a scheduled time, or otherwise. An example forwarding address is in the form <phoneNumber>@domainname.tld (top level domain, such as .com, .net, .org, .edu, .gov, or other TLD) (e.g., 8055554100@callwave.com). The Inter-Carrier SMS Gateway or SMSC is preconfigured to route addresses of this format, and this domain in particular, to the carrier's softswitch that performs a message routing function. This interface offers the option of forwarding Short Messages to the forwarding address, regardless of whether the mobile phone itself is currently available to receive the message.

Figure 6:
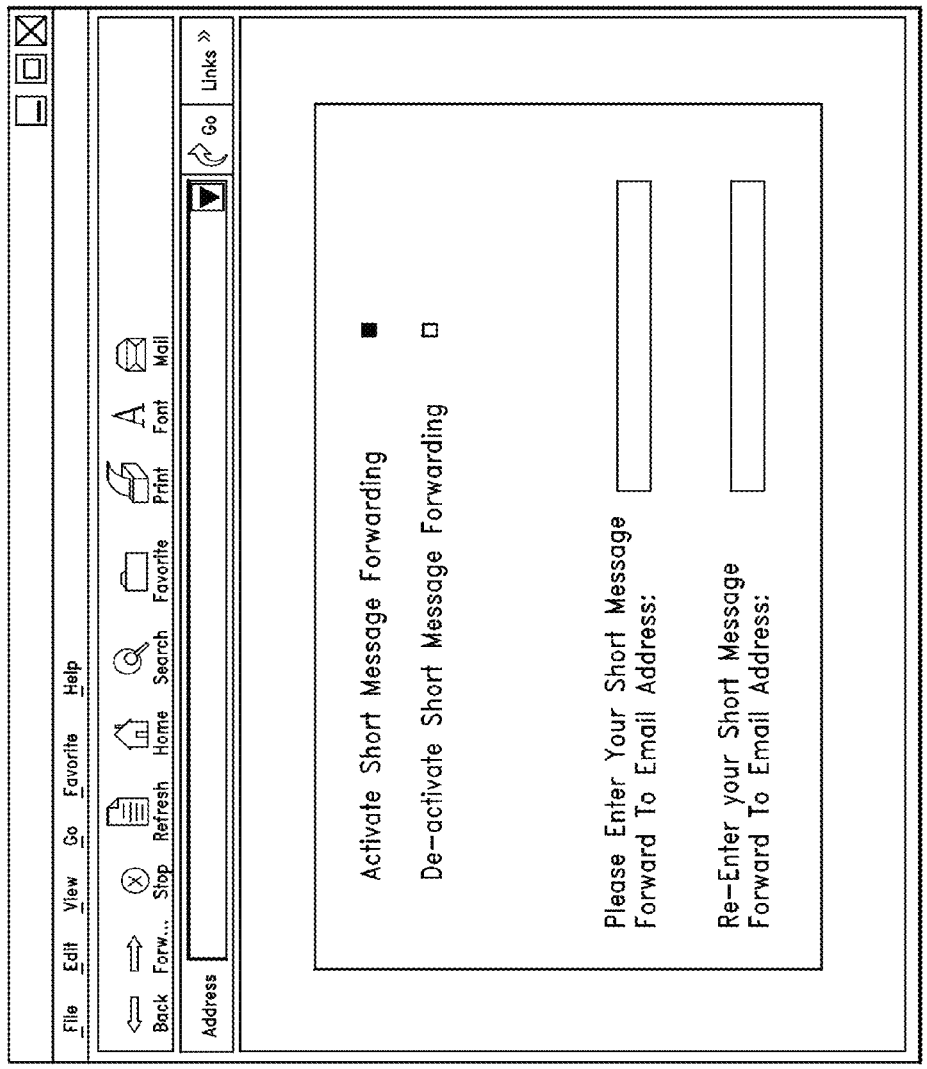
FIG. 6 illustrates an example user interface for configuring Short Message Forwarding service using a web browser.

FIG. 6 depicts an example web page used to configure the Short Message forwarding service address. A user can specify that Short Message forwarding is to be enabled or disabled via one or more corresponding fields or controls. The user can also enter into corresponding fields one or more forwarding addresses (e.g., forwarding email addresses). Other methods can be used to configure the Short Message forwarding service address, such as interactive voice response system or call center, by way of example and not limitation.

FIG. 3 illustrates another example user interface that displays a call log, wherein a call log entry optionally includes the date and time a call was received and if the caller's phone address is not private, the source of the call (e.g., an icon indicating whether the call was placed from the user's home, work, mobile, or fax phone address), the caller's phone address and/or name or other identifier. An entry can also indicate whether there is a recorded message left by the caller, and optionally the length (e.g., in seconds) of the message. Similarly, an entry can indicate whether a call is a fax call, and the length of the fax received (e.g., in pages).

A message, such as an SMS Short Message or an MMS message is optionally treated as another type of call or message by the telecommunications client. As illustrated in FIG. 3, the SM is optionally listed in the call log pane with other calls and messages. A Short Message log entry is optionally distinguished by an icon, coloring, and/or a label (e.g., 'SMS') in the details column of the log. The sender name (or other identifier), message length (e.g., in characters), and date/time the message was received can also be displayed.

New entries that have not yet been reviewed are optionally highlighted. A "new call" area displays the number of new calls the user has received. A contacts area displays at least a portion of a contact record for a contact (e.g., a contact corresponding to a selected log entry or otherwise selected).

By way of example, the contact record can include some or all of the following: contact name, address, phone address (es), email address(es), SMS address, company, title, name of ringback signal assigned to the contact, notes, and other information. An edit control is provided, which when activated, causes the contact record to be editable, wherein the edited contact record can then be saved into the contact database discussed herein. A "new" control is provided for creating a new contact record. A "click to add name" control is provided which, when activated, provides a user interface via which the user can add a name to a contact record that contains contact information, but not a contact name. Optionally, this user interface can display a speed dial assignment, as similarly discussed above.

When a Short Message entry in the log is selected, clicking on the play/view icon or double clicking on the selection optionally causes the Short Message to be displayed in the top pane of the telecommunications client.

Optionally, Delete, Reply, and Forward buttons or other controls are provided and displayed for responding to received Short Messages. Optionally, Reply and Forward requests result in a window being opened such as the example user interface illustrated in FIG. 5. Via the user interface, the user can enter into corresponding fields the name of a recipient (e.g., via a "to" field), an address, a subject, and a message. The user can also specify that a voice message is to be attached to the SM message. The user can record the voice message using a telecommunication client host microphone. Optionally, the user interface displays the current date. Optionally, a browse control is provided, which, when activated, enables the user to browse to or search for a desired file or link to attach or embed. Once the user locates the desired file or files, the user can select the file(s) or links thereto, which are then embedded or attached to the message. Optionally, a field is provided wherein the user can manually enter a desired file name and/or path. The user can optionally specify whether the file is to be embedded, attached, or linked. By way of example and not limitation, the files can include one or more of voice, fax, HTML, photos, video, music, program code, links, etc.

Figure 7A:
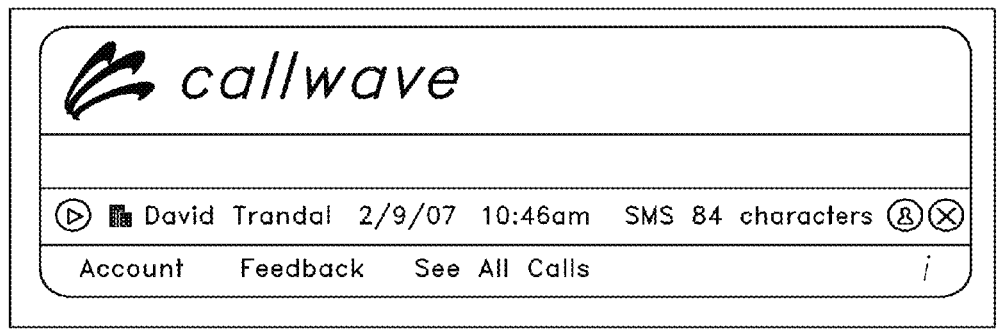
FIG. 7A-B illustrate still another example user interface.

FIG. 7A illustrates an example widget user interface displaying call information for the most recent received call. The user interface includes some or all of the following: the name/identifier (if available) of the caller/sender, the date of the call/message, the time of the call/message, the connect time for the call, length of message left (if any), or length of fax received (if any). In the illustrated example, the user interface indicates that an SMS message including 47 characters was received. An expand control is provided to expand the size and/or amount of information displayed. An account control is provided, which when activated causes an account management Web page to be presented. A feedback control is provided which, when activated, causes a form to be presented via which the user can submit feedback to the system operator/provider (e.g., like and dislikes regarding the system and services, problem issues, etc.), access a help interface, and/or access answers to frequently asked questions. A "see all calls" control is provided, which when activated, causes the user interface to list numerous past calls (e.g., all past calls, all past call received in a certain time period whose entries have not been deleted, a certain number of past calls, etc.), optionally in a scrollable user interface.

Figure 7B:
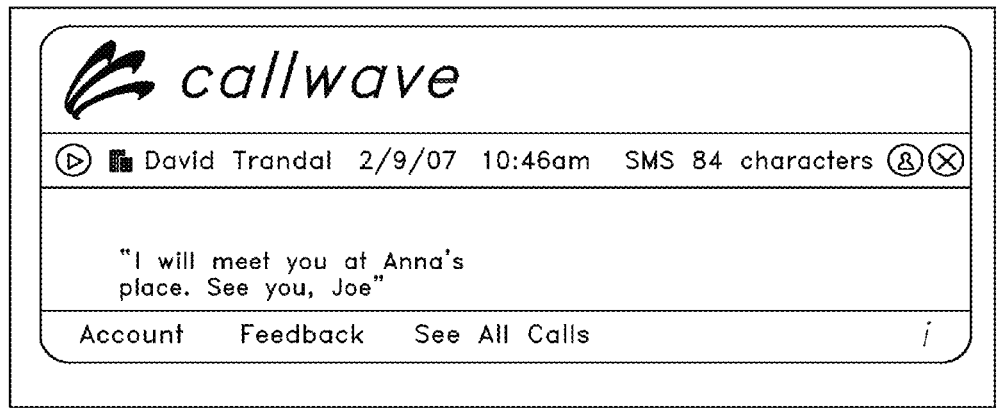

FIG. 7B illustrates an example expanded version of the user interface illustrated in FIG. 7A. The example view displays for an SMS message the calling number/SMS address and the message text (optionally in a scrollable window/area).

The Short Message Forwarding service can operate in the following example carrier environments wherein the carrier (e.g., the Carrier Partner):
  Identifies which customers are to have the Short Message Forwarding service enabled and for each identify their mobile phone number.
  Utilizes a wireless network where the HLR and SMSC support forwarding.
  Enables a message routing capable softswitch to interface with the HLR and SMSC to configure forwarding addresses and to indicate whether to forward all Short Messages or only those received when the given mobile phone is not available to receive the message.
  Configures the Inter-Carrier SMS Gateway or SMSC to route all Short Messages with addresses of the form <phoneNumber>@domainname.TLD to the forwarding address or to a softswitch that can route the messages to their destination addresses.

Figure 8:
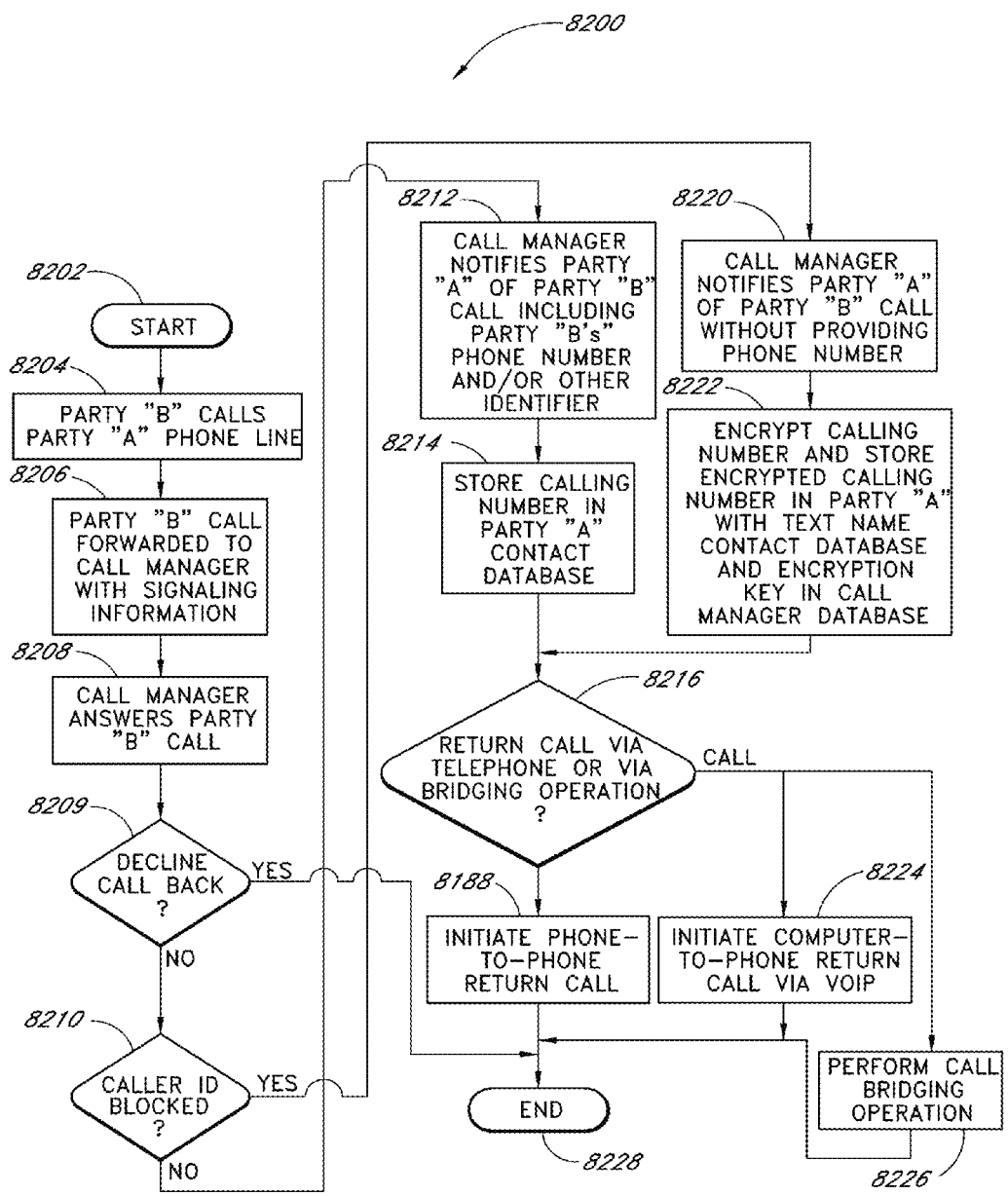
FIG. 8 illustrates an example return-call process in accordance with the present invention.

FIG. 8 illustrates an example return-call process 8200, wherein a called party, referred to as Party A, misses a call from a calling party, referred to as Party B, and then returns Party B's call. It is assumed for the purposes of this example that the called party's line is provisioned with "Call Forward On Busy," call forward on "Ring-No-Answer", and/or call forward when the user has activated a "do-not-disturb" feature.

Beginning at start state 8202, the process 8200 proceeds to state 8204. At state 8204, Party B calls Party A's phone line using, by way of example, the wired station 9102 illustrated in FIG. 9. At state 8210, Party B's call is forwarded to the call manager system 9124 over the PSTN, such as PSTN 108, along with signaling information. The signaling information includes Party B's phone number via ANI (Automatic Number Identification). Because Party B's call is being forwarded to the call manager system, the call manager system infers that Party's line is busy or that Party A is otherwise not available to take the call. Further, because the call manager is configured as a central telephone office and receives SS7 signaling information, even if Party B has caller-ID blocking on, so that Party B's telephone number is designated as "private," the call manager receives Party B's telephone number. The "private" designation is provided by a presentation indicator associated with each call that designates the calling party as private or public.

In one embodiment, Party A's line is configured so that calls are forwarded over the PSTN to either a local telephone number or a toll-free number associated with the call manager system when Party A's line is busy. The toll-free number may be an "800" or "888" number, by way of example. Because Party B's call is being forwarded to a toll-free number, even if Party B has caller-ID blocking on, and even if the call manager system is not configured as a central office, the calling number is transmitted to the call manager system. Optionally, the caller can call a phone number (e.g., a "virtual" phone number) associated with the caller and assigned to call processing system rather than having the caller's call forwarded to the call processing system.

At state 8208, the call manager system answers Party B's call. Party B is provided the option of recording a voice message on the call manager system for delivery to Party A. At state 8209, the call manager can also ask the Party B if Party A is to be notified of the call so that Party A can return the call. In this embodiment, if the caller declines, then no return call notification is provided to Party A, and the process 8200 ends. If Party B does want a return call notification provided to Party A, the process 8200 proceeds to state 8210.

A determination is made at state 8210 as to whether Party B's number is "private," with Caller-ID blocking activated. If Party B's number is not "private," it is designated as "public." If Party B's number is public, then at state 8212 the call manager transmits a message to Party A's computer terminal notifying Party A that Party B has attempted to call Party A, the message including Party B's phone number. In one embodiment, a telecommunications client application executing on Party A's computer terminal displays the message, including Party B's phone number, on the computer terminal's monitor. Optionally, the call manager waits to receive a presence indication, in the form of a log-on or a "keep alive" communication from the client application before transmitting the message. Alternatively or in addition, Party A can access a "missed calls" page from a web site operated in association with the call manager. Further, the call manager can email the message to Party A.

Optionally, the call manager can access a reverse number database or a contact database associated with Party A to locate a name or other identifier associated with Party B's phone number. If a corresponding name or other identifier is located, it can be included for display in the message provided to Party A. The contact database can be stored on Party A's terminal or the call manager system.

In addition, if Party B recorded a voice message, that message can be transmitted or streamed to Party A's computer terminal for playback in substantially real-time. At state 8214, the telecommunications client application or call manager system inspects Party A's contact database to determine if a record exists for Party B's number. If not, the telecommunications client application or call manager offers to create a contact record for Party B. If Party A agrees to have a contact record created for Party B, the telecommunications client application or call manager automatically populates the contact record with Party B's phone number, and if available, name, and enables Party A to edit or add information to the record. Party A can then instruct that the contact record be saved and closed. Party A can later place calls to Party B using the stored contract information.

If Party B's number is "private," the process 8200 proceeds from state 8210 to state 8220. As discussed above, even if Caller-ID blocking is on, the call manager system still receives Party B's phone number. However, in order to protect the caller's privacy and if needed to comply with federal or other regulations, the call manager system notifies Party A that a call was received, but does not provide for display Party B's phone number unless authorized by the calling party in response to a request from the call manager system. The authorization can be provided through one or more voice prompt interactions. However, if Party B recorded a voice message, the call manager system transmits the voice message to Party A's computer for playback by Party A.

Proceeding to state 8222, the telecommunications client application or call manager system inspects Party A's contact database to determine if a record exists for Party B's number. If not, the telecommunications client application or call manager system offers to create a contact record for Party B. If Party A agrees to have a contact record created for Party B, the telecommunications client application or a call manager encryption server, automatically encrypts the caller's number with an encryption key so that Party A cannot read the number, and populates the record with Party B's encrypted phone number, and other available, non-private information. The encryption key is stored on a call manager encryption server so that the encrypted number can be later decrypted. Party A can edit or add information to the record. For example, Party A can tag the encrypted number with a text identifier, such as the caller's name, to help Party A be able to later locate and call Party B using the contact database record. Party A can then instruct that the contact record be saved and closed. Party A can later place calls to Party B using the stored contact information.

Alternatively, the private phone number can be stored on the call manager system server and an index or pointer to the phone number is stored on Party A's computer system. When Party A wants to later call Party B, Party A initiates the transfer of the index to the call manager, which then transfers the phone number to Party A's telecommunications client application. The telecommunications client application then initiates a call to Party B without displaying the phone number to Party A.

Proceeding to state 8216, Party A can be offered a choice of returning Party B's call using Party A's conventional POTs telephone, via Party A's VoIP-enabled terminal, or by a call bridging operation performed by the call manager. In one example method, if Party B's number is designated as private, Party A may be limited to returning Party B's call by the call bridging operation.

If Party A elects to have the call placed using a conventional telephone, then the process proceeds to state 8218, where a call is initiated over Party A's telephone. In particular, the computer modem dials the phone number provided in the call manager message, and the Party A picks up the telephone handset to talk with Party B when Party B answers.

If Party A elects to have the call placed using VoIP, then the process proceeds to state 8224, where a call is initiated by Party A's computer terminal. The VoIP software transmits the phone number provided in the call manager message to a VoIP gateway that converts the call data from packets into a form suitable for telephonic communications with the caller's phone, and connects the call via the PSTN to the original caller. The called party can then communicate with the original caller using the computer terminal handset. Using VoIP to return the call avoids having Party B's phone number appear on Party A's phone bill.

If Party A elects to have the call placed using a bridging operation, then the process proceeds to state 8226, where a call is bridged between Party A and Party B by the call manager. A notification is sent from Party A's client application, call manager website, or other notification device of Party A's desire to return a call to Party B. Included in Party A's request is a unique identifier, such as a database pointer or index, that allows the call manager system to determine Party B's phone number from a database of stored/encrypted numbers. The call manager system first calls Party A's phone number which is specified in Party A's request. The call can be placed, by way of example, as a POTs or VoIP call. Next, the call manager system calls Party B's line and bridges Party A with Party B. Alternatively, the call manager system first calls Party B's phone number, then the call manager system calls Party A's line and bridges Party A with Party B. Other bridging techniques which are well known to those of ordinary skill in the industry, and hence not explained in detail herein, can be used as well. The process ends at state 8228. Alternatively, rather than asking Party A to select whether the call is to be placed using the telephone or using VoIP, the telecommunications client application detects if Party A is online. If so, the call is automatically placed using VoIP. If Party A is offline, the call is automatically placed via the telephone, with the computer modem performing the dial-up operation.

Figure 9:
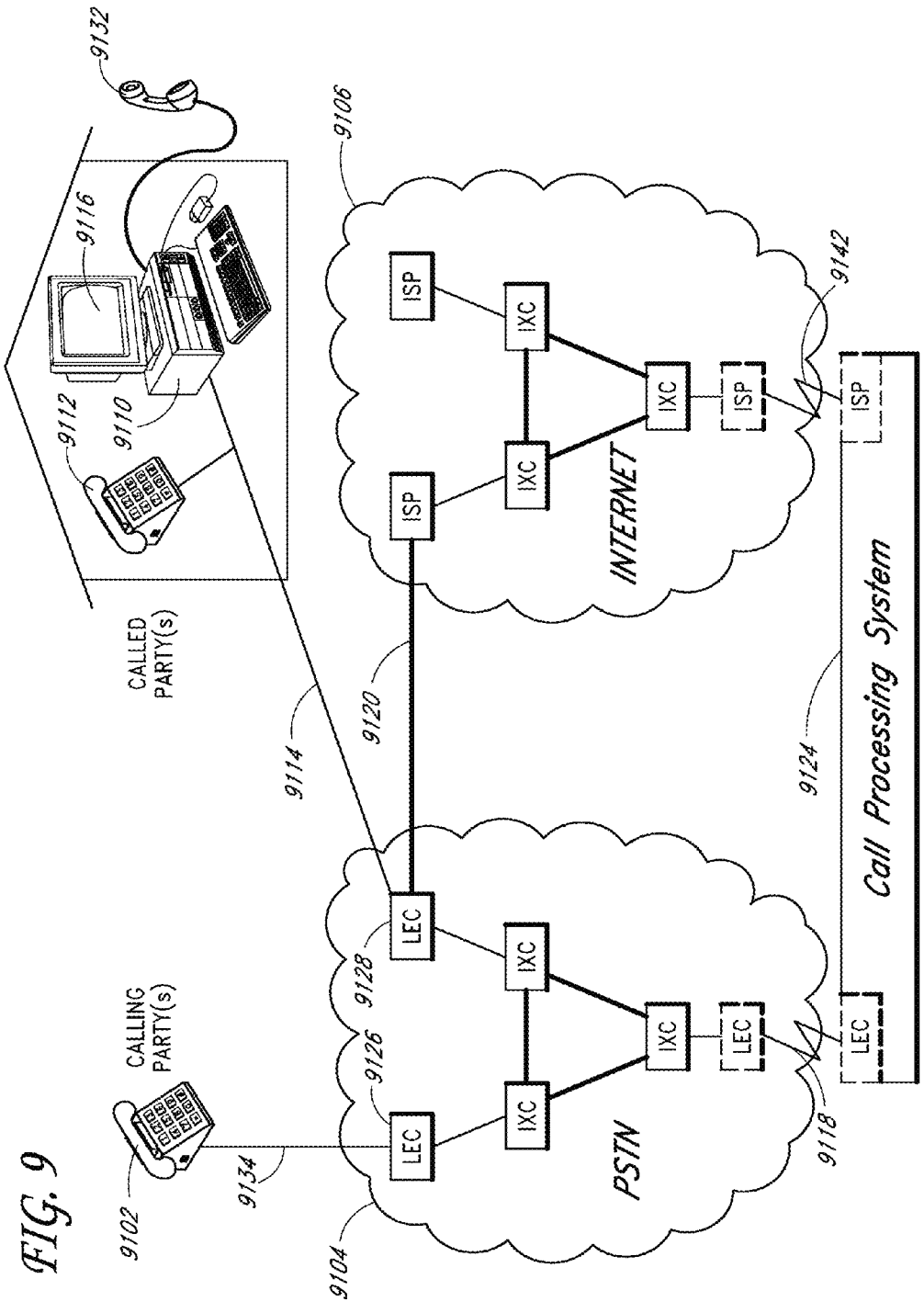
FIG. 9 illustrates an example telecommunications system that can be used in accordance with one embodiment of the present invention.

FIG. 9 illustrates an example telecommunications system that can be used in accordance with the present invention. As illustrated, the telecommunications system includes:

a plurality of user telephone stations 9102, 132;

a plurality of user computer terminals 9110;

a call processing system 9124 that acts as an Internet Answering Machine (IAM) system.

These devices are linked together using various line and trunk circuits to a Public Switched Network (PSTN) 108 and to a common data network, such as the Internet 128.

Figure 10:
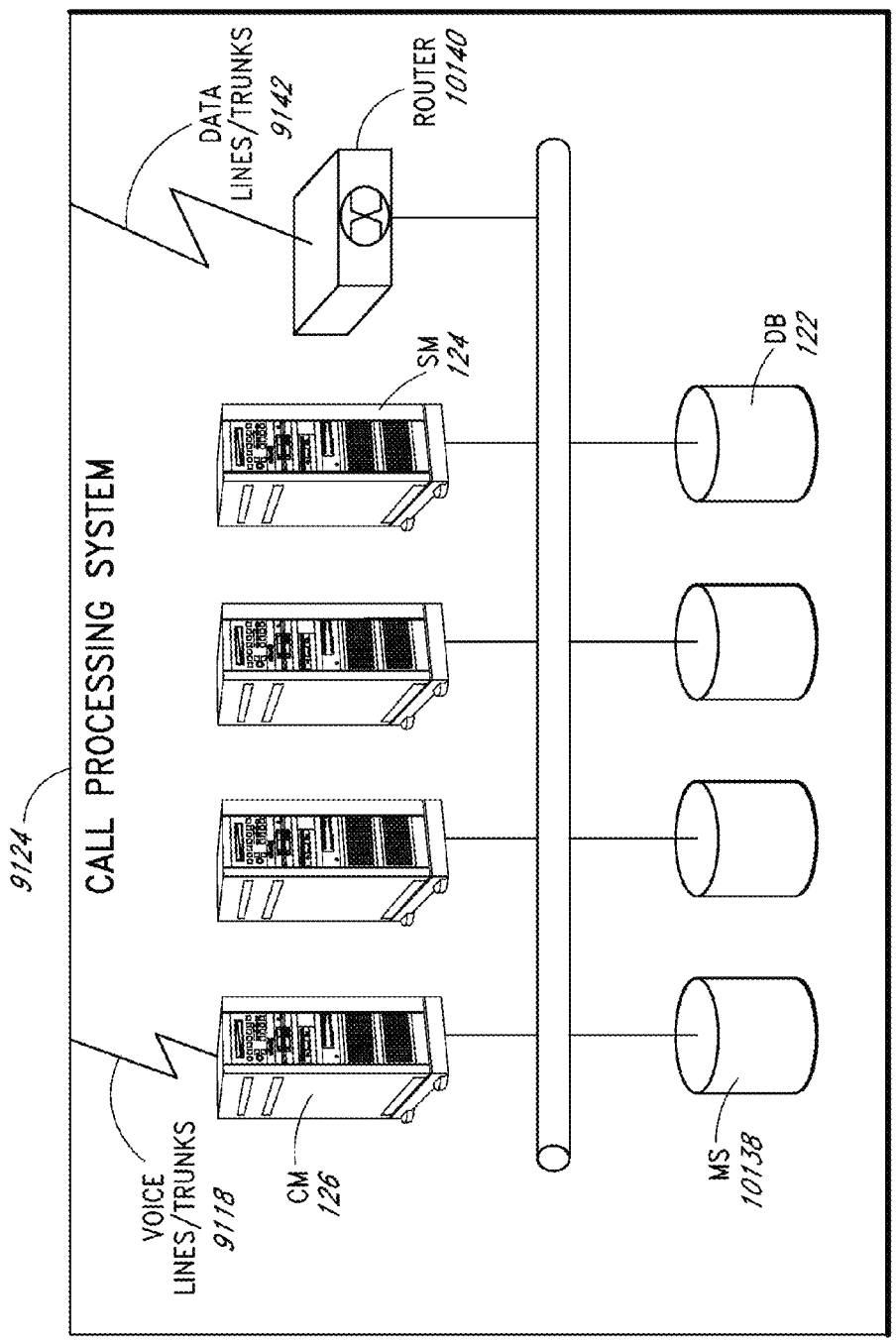
FIG. 10 further details the subsystems that comprise the IAM system depicted in FIG. 9 described above.

FIG. 10 further decomposes the JAM system 9124 into its functional components:

a Call Management (CM) subsystem 126, which serves as the interface to the PSTN 9104 to manage inbound and outbound telephone calls;

a Router subsystem 10140, which serves as the interface to the Internet 128 to manage communications between online IP client devices and the various JAM servers;

an online presence detection Internet Session Management (SM) subsystem 124, which monitors the status of subscriber data terminals to determine availability for call handling services;

a shared Media Storage (MS) subsystem 10138, which persistently archives the callers voice messages and the called party/subscriber's personal greeting(s);

an JAM Database (DB) subsystem 122 in which called party/subscriber JAM service parameters are stored.

These devices are linked together using various line and trunk circuits to a Public Switched Network (PSTN) 104 and to a common data network, such as the Internet 128.

These various subsystems are interconnected via a Local Area Network (LAN) and/or via a Wide Area Network (WAN). Other embodiments of the JAM system 9124 are described in U.S. patent application Ser. No. 09/539,375, filed Mar. 31, 2000, now U.S. Pat. No. 6,477,246, the contents of which are incorporated herein in their entirety by reference.

Referring back to FIG. 9, the user telephone stations 9102, 132 are respectively connected to local exchange switches 9126, 9128 via telephone lines 9134, 9114. The stations 9102, 132 can optionally be conventional POTS (Plain Old Telephone Service) telephones or local extensions behind a corporate Private Branch Exchange (PBX).

The telephone stations 9102, 132 can be coupled to the same switch or different switches. If the telephone stations 9102, 132 are coupled to the same switch, the switch will be local to both the calling and called parties, such as for intra-LATA or local calls. If telephone stations 9102, 132 are coupled to different switches, each switch may be local only to one of the parties, as is the case for non-local calls such as inter-LATA (long-distance) calls.

In the illustrated embodiment, the CM subsystem 126 is coupled into the PSTN 108 through voice trunk circuits 9118 directly interfacing with the Inter Exchange Carrier's (IXC) circuit switched or packet switched telephony network. Thus, advantageously the IAM system 9124 does not have to be directly serviced by the same Local Exchange Carrier's (LEC) switch or PBX as the calling or called terminals 9102 and 132. Indeed, the IAM system 9124 or its individual subsystem components can be located in a different country than the called and calling parties. In this instance, the IAM system 9124 is optionally configured as, or to appear as, a telephone end office and can interface with the PSTN 108 as a Class 5 switch. In other embodiments, the IAM system 9124 is locally attached to a LEC switch with a physical line or local trunk interface circuit. This switch may or may not be serving telephone stations 9102 and/or 132.

The IAM voice trunk circuits 9118 are not limited to a particular signaling convention. For example, the present invention can be utilized with a Common Channel Signaling system, such as Signaling System 7 (SS7), having separate voice/user data and signaling channels. In addition, the present invention can be used with other signaling methods, such as the following trunk-side signaling interfaces: ISDN-PRI; Advanced Intelligent Network; and/or Service Node architectures. Preferably, the selected signaling system provides a suite of call presentation information to the IAM system 9124, including one or more of:

ANI—Automatic Number Identification: phone number and privacy indicator of the calling party ("Caller-ID").

DNIS—Dialed Number Identification: phone number of the JAM system's voice trunks 9118 that the call was forwarded to.

OCN—Original Called Number Identification: phone number of the original called party (subscriber to the IAM service).

The telephone lines 9134, 9114 may be shared with one or more computer terminals. For example, telephone terminal 132 shares the telephone line 9114 with a computer terminal 9. While in the illustrated example the computer terminal 9 is a personal computer, the computer terminal 9 can be an interactive television, a networked-enabled personal digital assistant (PDA), other IP (Internet Protocol) device, or the like. Alternatively, the computer terminal 9 can be a personal computer having a monitor, keyboard, a mouse, a disk drive, sound card or similar sound reproduction circuitry such as a codec, streaming media playback software, such as the Media Player program available from Microsoft, speakers, and a modem, such as a standard V.90 56K dial-up modem. The modem can optionally be configured to dial-up a number under control of an application, such as a contact manager application or telecommunications client application phone dialer, stored and executing on the computer terminal 9.

The telephone line 9114, can be used to establish a dial-up connection for computer terminals, such as terminal 9 via the computer modem, to an Internet Service Provider (ISP) offering dial-in remote access service connections from the PSTN 108 via trunk interface circuits 9120. The computer terminal 9 can also be connected to the Internet 128 via a broadband connection, such as a DSL line, a television cable line, or a T1 line.

In addition, the computer terminal 9 can be equipped with a Voice over Internet Protocol (VoIP) software module and a headset or a handset 9132, including a microphone and speaker, allowing voice communications to be conducted over a computer network, such as the Internet 128. VoIP communicates information via packet switching, which opens a connection just long enough to send a small packet of data. Each packet includes a destination address informing the network where to send the packet along with the actual voice data payload. If the receiving station is also a VoIP terminal, then when the receiving terminal receives the packets, VoIP software executing on the receiving terminal reassembles the packets into the original data stream. The data stream is then converted to a voice signal. If the receiving station is a conventional telephone, then a VoIP gateway converts the packets into a voice signal that is then connected to the PSTN 108.

Optionally residing and executing on the computer terminal 9 is a communications management Client application 136. The Client application 136 is used to provide enhanced communication services, as discussed in greater detail below. The Client application 136 is connected to and communicates with the JAM system 9124 via the Internet 128, other public wide area computer networks, or the like.

The JAM system 9124 optionally hosts a Web site used by subscribers of the JAM service to setup and manage their accounts, to view information about incoming calls, and to instruct the JAM system 9124 on how to route incoming calls to one or more destination stations. Many of these same functions can be implemented by the Client application 136 as well.

Figure 11:
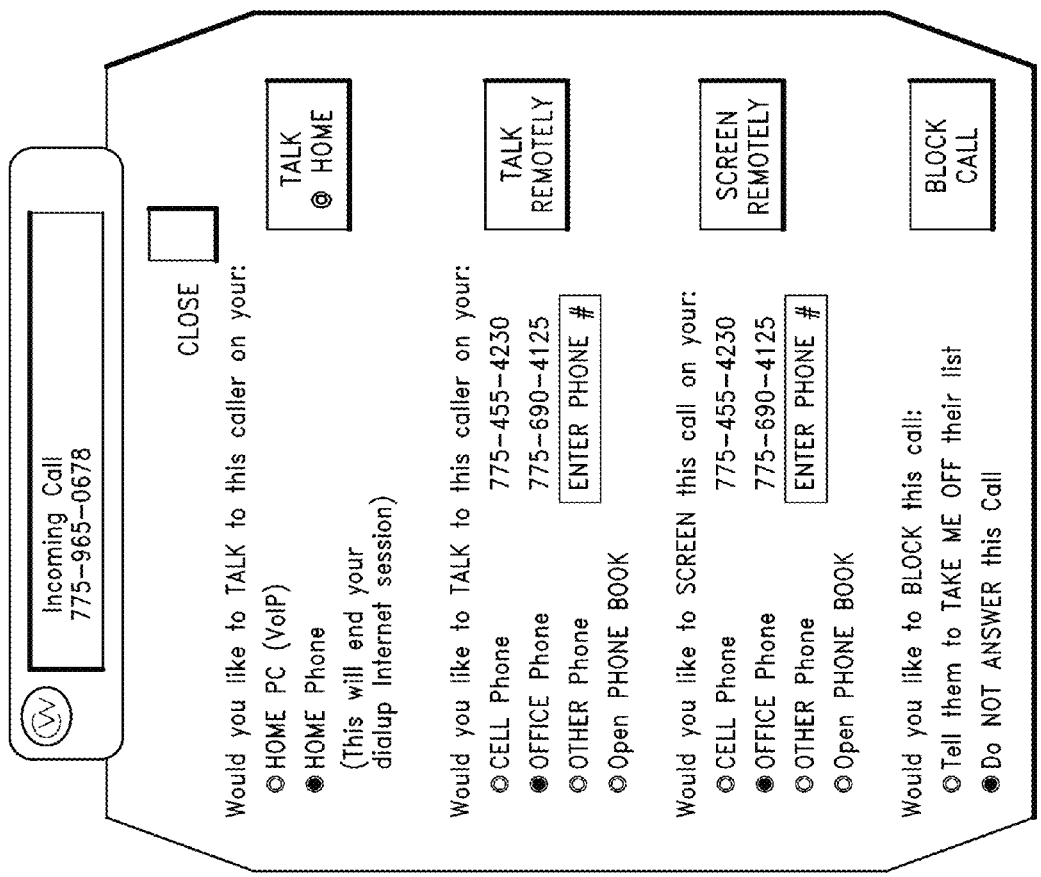
FIG. 11 displays an example menu of call screening/handling options available to the called party during the processing of the inbound call

While monitoring the Caller-ID of the incoming call, via the Incoming Call field illustrated in FIG. 11 for example, and listening to the corresponding streaming message, the called party is presented with one or more of the following options (see FIG. 11 which depicts an example Client application popup dialog menu):

1. do nothing.
2. pickup (answer) the call to talk to the caller using a software telephone running on the "home PC" (the computer terminal 9).
3. pickup (answer) the call to talk to the caller using the "home phone" on the phone line used to connect to the Internet (the user telephone station 132).
4. pickup (answer) the call to talk to the caller after transferring the call to an alternate phone or to an alternate PC.
5. continue screening the call after transferring it to an alternate phone or to an alternate PC.
6. terminate the call substantially immediately—with a do not disturb message.
7. do not answer the call.

The called party may choose to ignore the incoming call. For example, the call may not have been urgent enough to interrupt what they are doing or the call may have been intended for another member of the household. Under option (1), the called party can close the call handling options dialog box illustrated in FIG. 11 using the "CLOSE" option, thereby informing the IAM system 9124 that no further instructions for caller interaction will be forthcoming. Alternatively, the called party, having screened the Caller-ID of the incoming call and/or the associated caller's message, can simply continue doing what they were doing before the call arrived. After the caller has left a complete message, as indicated by the caller terminating the call or after a predetermined recording time period, the IAM system 9124 downloads the recorded message to the subscriber's computer terminal 9 and updates the Client application's call log, which lists the calls handled by the IAM system 9124 for the called party. The message is archived in the MS subsystem 10138 and is also available locally on the computer terminal 9 for playback at the called party's convenience.

Under option (2), the called party may decide to pickup the call in progress to talk to the calling party using the computer terminal 9. Having screened the call, the called party can signal the IAM system 9124 to indicate a desire to talk to the calling party using VoIP. For example, the called party can activate the "HOME PC (VoIP)" option displayed in FIG. 11. After the called party has selected option (2), the Client application 136 sends an instruction by way of an Internet-based client/server control message to the IAM system 9124. Upon receiving the instruction, the IAM system 9124 interrupts the recording and streaming process and plays a canned audio prompt to the calling party. The audio prompt can be, for example, "please hold while your call is being connected," followed by audible ringing. The IAM system 9124 then bridges, in full duplex mode, the inbound call from the calling party to the CM subsystem 126 with the outbound VoIP call from the CM subsystem 126 to the called party computer 9.

The IAM system 9124 will stay bridged between the calling party and called party for the duration of the call and may respond to internal events or called party actions. For example, the IAM system 9124 can selectively interrupt the bridged call if a time limit is exceeded and play an announcement to notify the calling party and/or the called party that the call will be terminated shortly. The IAM system 9124 can also initiate or transmit a warning message directly to the Client application 136 that then displays a visual notice regarding call termination or the like on the called party's computer terminal 9.

Thus, example methods and systems are described that can be utilized wirelessly forward a message (e.g., an SMS or MMS message) to a destination other than the addressed destination (e.g., when the addressed destination, such as a mobile phone, is not available) and to forward or broadcast a message (e.g., an SMS or MMS message) to a plurality of destinations, even if the message is addressed to a single destination. Certain example embodiments described store a message intended for an unavailable destination, such as a mobile phone, and when the destination becomes available, transmits the stored message to the destination.

It should be understood that certain variations and modifications of this invention would suggest themselves to one of ordinary skill in the art. The scope of the present invention is not to be limited by the illustrations or the foregoing descriptions thereof.

What is claimed is:

1. A method of managing messages, the method comprising:
providing a communications software program to a computing device associated with a user,
wherein the communications software program, installed on the computing device associated with the user, is configured as a first destination address, and
wherein a mobile phone associated with the user is associated with a destination phone address, and
wherein the first destination address is different than the destination phone address;
enabling a Short Message Service (SMS) message from a sender's mobile phone originally addressed to the destination phone address associated with the mobile phone of the user to be mirrored to the communications software program configured as the first destination address, installed on the computing device associated with the user;
receiving via an Internet Protocol connection, by the communications software program, the mirrored SMS message from the sender's mobile phone in association with a phone address of the sender's mobile phone, wherein the received mirrored SMS message is originally addressed to the destination phone address associated with the mobile phone of the user;
enabling the user, via a user interface of the communications software program, to view the received mirrored SMS message on the computing device associated with the user and to create a contact record from the received mirrored SMS message, the contact record including at least the phone address of the sender's mobile phone;
enabling the user, via the user interface of the communications software program, to create a reply Multimedia Messaging Service (MMS) message corresponding to the received mirrored SMS message,
wherein the reply message is addressed to the phone address of the sender's mobile phone;
wherein the reply message comprises an audio message or a photo;
initiating transmission of the MMS reply message corresponding to the received mirrored SMS message to a Multimedia Message Service Center (MMSC); and
synchronizing the created contact record with a plurality of instances of the communications software program associated with a respective plurality of computing devices of the user.

2. The method as defined in claim 1, wherein the destination phone address is a telephone number.

3. A system comprising:
at least one network-based server computing device;
a network interface;
non-transitory computer readable memory that stores a program that, when executed by the one or more processing devices, causes the system to perform operations comprising:
associating the program with a user and a first destination address,
wherein the first destination address is different than a destination telephone number of a mobile device of the user;
enabling a Short Message Service (SMS) message from a sender's mobile phone originally addressed to the destination phone address associated with the mobile device of the user to be mirrored to the communications software program configured as the first destination address, installed on the computing device associated with the user;
receiving via an Internet Protocol connection the mirrored SMS message from the sender's mobile phone in association with a phone address of the sender's mobile phone, wherein the received mirrored SMS message is originally addressed to the destination telephone address of the mobile device of the user;

enabling the user, via a user interface, to view the received mirrored SMS message;

enabling the user, via the user interface, to create a reply Multimedia Messaging Service (MMS) message corresponding to the received mirrored SMS message, wherein the reply MMS message is addressed to the phone address of the sender's mobile phone;

wherein the reply message comprises an audio message or a photo; and initiating transmission of the MMS reply message corresponding to the received mirrored SMS message to a Multimedia Message Service Center (MMSC);

enabling, via the user interface, to create a contact record from the received mirrored SMS message including at least an originating address associated with the received mirrored SMS message; and synchronizing the created contact record with a plurality of instances of the communications software program associated with a respective plurality of computing devices of the user.

4. The system as defined in claim 3, wherein the SMS message comprises a plurality of short messages.

5. The system as defined in claim 3, the operations further comprising enabling the user to record the audio message.

6. The system as defined in claim 3, the operations further comprising enabling the user, via the user interface, to forward the received mirrored SMS message.

7. The system as defined in claim 3, the operations further comprising enabling the user, via the user interface, to edit the originating address associated with the received mirrored SMS message.

8. The system as defined in claim 3, the operations further comprising: at least partly in response to the received mirrored SMS message, enabling the user to initiate a call to the phone address of the sender's mobile phone.

9. The system as defined in claim 3, wherein the program is upgradable over the Internet Protocol connection.

10. The system as defined in claim 3, the operations further comprising:
enabling the SMS message to be stored and enabling the user to access the stored SMS message.

11. The system as defined in claim 3, the operations further comprising:
receiving, via the user interface, an originate call request from the user; and
causing, at least in part, an outbound call to be placed to the originating address associated with the SMS message.

12. The system as defined in claim 3, the operations further comprising:
receiving, via the user interface, an originate call request from the user; and
causing, at least in part, an outbound call to be placed to a destination phone address in a contact record stored by the system.

13. A system comprising:
at least one network-based server computing device;
a network interface;
non-transitory computer readable memory that stores a program that, when executed by the one or more processing devices, causes the system to perform operations comprising:

associating the program with the user and a first destination address, wherein the first destination address is different than a destination telephone number of a mobile device of the user;

enabling a Short Message Service (SMS) message from a sender's mobile phone originally addressed to the destination phone address associated with the mobile device of the user to be mirrored to the communications software program configured as the first destination address, installed on the computing device associated with the user;

receiving via an Internet Protocol connection the mirrored Short Message Service SMS message from the sender's mobile phone in association with a phone address of the sender's mobile phone, wherein the received mirrored SMS message is originally addressed to the destination telephone address of the mobile device of the user;

enabling the user, via a user interface, to view the received mirrored SMS message;

enabling the user, via the user interface, to send a reply SMS message to the sender's mobile phone corresponding to the received mirrored SMS message,
wherein the reply message is addressed to the phone address of the sender's mobile phone, and
wherein the reply SMS message is routed to a Short Message Service Center (SMSC);

enabling, via the user interface, to create a contact record from the received mirrored SMS message including at least an originating address associated with the received mirrored SMS message; and synchronizing the created contact record with a plurality of instances of the communications software program associated with a respective plurality of computing devices of the user.

14. The system as defined in claim 13, wherein the SMS message comprises a plurality of short messages.

15. The system as defined in claim 13, the operations further comprising enabling the user to forward the received mirrored SMS message.

16. The system as defined in claim 13, the operations further comprising enabling the user, via the user interface, to edit the originating address associated with the received mirrored SMS message.

17. The system as defined in claim 13, the operations further comprising: at least partly in response to the received forwarded SMS message, enabling the user to initiate a call the phone address of the sender's mobile phone.

18. The system as defined in claim 13, the operations further comprising:
enabling the SMS message to be stored and enabling the user to access the stored SMS message.

19. The system as defined in claim 13, the operations further comprising:
receiving, via the user interface, an originate call request from the user; and
causing, at least in part, an outbound call to be placed to the originating address associated with the SMS message.

20. The system as defined in claim 13, the operations further comprising:
receiving, via the user interface, an originate call request from the user; and
causing, at least in part, an outbound call to be initiated to a destination phone address in a contact record stored by the system.

* * * * *

UNITED STATES PATENT AND TRADEMARK OFFICE
CERTIFICATE OF CORRECTION

PATENT NO. : 9,497,308 B1
APPLICATION NO. : 14/508103
DATED : November 15, 2016
INVENTOR(S) : Kirchhoff et al.

Page 1 of 1

It is certified that error appears in the above-identified patent and that said Letters Patent is hereby corrected as shown below:

On the Title Page

In Column 2 (page 1, item (56)) at Line 15, Under Other Publications, change "/widpet" to --/widget--.

In the Drawings

Sheet 2 of 11 (Reference Numeral 136, FIG. 2) at Line 1, Change "Teleommunication" to --Telecommunications--.

In the Specification

In Column 3 at Line 5, After "call" insert --.--.

In Column 5 at Line 23, After "standards" insert --.--.

In the Claims

In Column 22 at Line 44, In Claim 17, after "call" insert --to--.

Signed and Sealed this
Twenty-first Day of March, 2017

Michelle K. Lee
*Director of the United States Patent and Trademark Office*